(12) United States Patent
Antinori et al.

(10) Patent No.: US 12,436,756 B2
(45) Date of Patent: Oct. 7, 2025

(54) INTRA-VEHICLE OVER-THE-AIR UPDATES

(71) Applicant: Red Hat, Inc., Raleigh, NC (US)

(72) Inventors: Paolo Antinori, Milan (IT); Andrea Cosentino, Milan (IT)

(73) Assignee: Red Hat, Inc., Raleigh, NC (US)

( * ) Notice: Subject to any disclaimer, the term of this patent is extended or adjusted under 35 U.S.C. 154(b) by 127 days.

(21) Appl. No.: 18/326,856

(22) Filed: May 31, 2023

(65) Prior Publication Data
US 2024/0403021 A1    Dec. 5, 2024

(51) Int. Cl.
*G06F 8/65* (2018.01)

(52) U.S. Cl.
CPC ...................... *G06F 8/65* (2013.01)

(58) Field of Classification Search
CPC ........................................................ G06F 8/65
See application file for complete search history.

(56) References Cited

U.S. PATENT DOCUMENTS

| | | | |
|---|---|---|---|
| 8,572,184 B1 * | 10/2013 | Cosoi | H04L 51/212 709/224 |
| 10,427,655 B2 | 10/2019 | Nix | |
| 10,503,176 B2 | 12/2019 | Esher et al. | |
| 10,572,243 B2 | 2/2020 | Ewert | |
| 10,871,952 B2 | 12/2020 | Wang et al. | |
| 11,216,267 B2 | 1/2022 | Becker et al. | |
| 11,409,513 B2 | 8/2022 | John | |
| 11,449,327 B2 | 9/2022 | David et al. | |
| 2006/0048141 A1 | 3/2006 | Persson et al. | |
| 2017/0242679 A1 | 8/2017 | Sangameswaran et al. | |
| 2018/0336026 A1 * | 11/2018 | Park | H04L 67/34 |
| 2021/0109738 A1 | 4/2021 | Jung | |
| 2021/0224056 A1 * | 7/2021 | John | H04W 4/46 |
| 2022/0147337 A1 | 5/2022 | Michelsohn et al. | |
| 2022/0276856 A1 | 9/2022 | Guo et al. | |
| 2022/0353652 A1 | 11/2022 | Fechtel et al. | |

(Continued)

FOREIGN PATENT DOCUMENTS

| | | | | |
|---|---|---|---|---|
| CN | 110971651 A | * | 4/2020 | ............... G06F 8/00 |
| CN | 111638894 A | * | 9/2020 | |
| CN | 113918188 A | * | 1/2022 | ............... G06F 8/71 |

(Continued)

OTHER PUBLICATIONS

NPL_CN 110971651 A_Processing System, Updating Server And Method For Updating Processing System (Year: 2020).*

(Continued)

*Primary Examiner* — Ziaul A Chowdhury
(74) *Attorney, Agent, or Firm* — Womble Bond Dickinson (US) LLP

(57) ABSTRACT

A method of managing applications of a first vehicle includes establishing, by the first vehicle, a network with a second vehicle in proximity to the first vehicle, receiving, by the first vehicle from the second vehicle over the network, application metadata associated with a plurality of applications executing on the second vehicle, based on the application metadata, transmitting a list to the second vehicle over the network, wherein the list identifies one or more application updates associated with the plurality of applications, and receiving the one or more application updates from the second vehicle over the network.

14 Claims, 11 Drawing Sheets

(56) References Cited

U.S. PATENT DOCUMENTS

2023/0202489 A1* 6/2023 Witte .................. B60W 50/00
                                                                717/168

FOREIGN PATENT DOCUMENTS

| EP | 3992778 A1 | 5/2022 |
| JP | 2012108709 A | 6/2012 |

OTHER PUBLICATIONS

NPL_CN 111638894 A_Software Upgrading Method, Device And Computer Storage Medium (Year: 2020).*

Elgammal, et al. "Vehicle Software Update over ICN Architectures." Jan. 2021, 12 pages, ICST Institute for Computer Sciences, Social Informatics and Telecommunications Engineering 2021, Springer Nature Switzerland AG.

Halder et al., "Secure OTA Software Updates in Connected Vehicles: A Survey," published Apr. 1, 2019, located at https://arxiv.org/pdf/1904.00685.pdf, 18 pages.

"Deploy Over-The-Air Infrastructure Using Open Source Technologies," published Apr. 13, 2022, located at https://www.redhat.com/en/resources/deploy-over-the-air-infrastructure-overview, 8 pages.

Petri et al. "Evaluation of Lightweight TPMs for Automotive Software Updates over the Air," located at https://ftp.pwg.org/pub/pwg/liaison/escar/tpm_paper_2016_0513_final.pdf, 15 pages.

Hbaieb et al., "Internet of Vehicles and Connected Smart Vehicles Communication System Towards Autonomous Driving," Publication date May 5, 2021, located at https://www.researchgate.net/publication/352116116_Internet_of_Vehicles_and_Connected_Smart_Vehicles_Communication_System_Towards_Autonomous_Driving/link/60b9b360458515218f8a21b8/download, 46 pages.

"Best practices for uninstallation of Windows updates," Retrieved by Applicant from the internet on May 17, 2023, located at https://rmm.datto.com/help/en/Content/2SETUP/BestPractices/Best_Practices_Windows_Updates_Uninstallation.htm, 3 pages.

* cited by examiner

INTRA-VEHICLE OVER-THE-AIR UPDATES

TECHNICAL FIELD

Aspects of the present disclosure relate to performing operational updates of vehicles and, more particularly, to performing operational updates utilizing an over-the-air (OTA) interface between vehicles.

BACKGROUND

Many vehicles, such as automobiles, drones, and the like, may include computing devices. For example, some vehicles may contain electronic control units (ECUs), which include embedded systems in automotive electronics that control one or more of the electrical systems or subsystems in a car or other motor vehicle. An ECU can receive input from one or several parts of the vehicle and use that information to manage vehicle operations. An automobile may contain several ECUs. In some cases, different ECUs are used to monitor and/or control different vehicle functions. For example, separate ECUs may be used, in a vehicle, to control the engine, the transmission, the brakes, the suspension, etc. The ECUs may execute software (e.g., computer instructions) to accomplish the various functions of the ECU.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
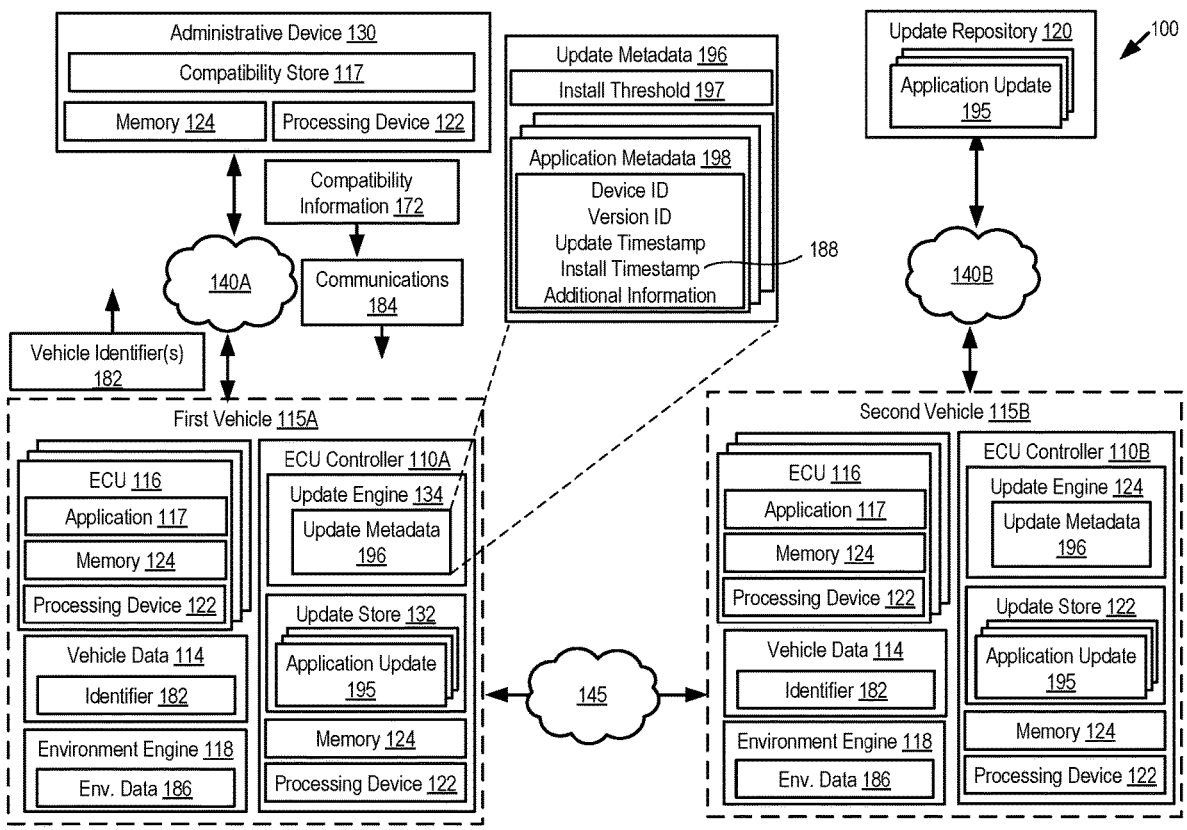
FIG. 1 is a schematic block diagram that illustrates an example system, according to some embodiments of the present disclosure.

Modern motor vehicles may have hundreds of ECUs. An ECU can be a digital computer that can read signals coming from sensors placed at various parts and in different components of the automobile and, depending on this information, can control various important units, e.g., engine and automated operations within the automobile, and can monitor the performance of components used in the automobile.

An ECU can comprise hardware and software. In some embodiments, the software may be firmware that is loaded from non-volatile storage on the ECU. The hardware can include various electronic components and/or a circuit that is configured to execute software that performs the operations of the ECU. One component of the ECU can be a microcontroller chip along with memory (e.g., non-volatile and/or volatile memory) that can include, for example, an electrically programmable read-only memory (EPROM) or a flash memory chip. Software instructions for performing the operations of the ECU may be stored in the memory, and can execute on the microcontroller. The ECU circuitry may include input/output (I/O) interfaces that may be coupled to sensors distributed throughout the automobile. The ECU (e.g., utilizing the microcontroller) may be configured to monitor functions of the automobile utilizing the I/O interfaces and perform management of particular automotive functions.

The computer instructions executing on the ECU may perform operations utilizing software applications. For example, in some embodiments, the ECU applications may be embedded software that is organized as software containers that execute the functions of the ECU. The use of embedded software may allow for greater flexibility with the ECU. For example, a new feature and/or an improved feature for an ECU may, in some embodiments, be implemented utilizing software instructions rather than a hardware modification. Thus, to add new features, fix a bug, or add an improvement, new firmware may be developed and loaded onto the ECU. This allows improvements to be made to the ECU without requiring the expense associated with the development and/or installation of new hardware.

Additionally, automakers face rising customer demand for seamless connectivity solutions and energy management capabilities, as well as more autonomous features ranging from partially autonomous features such as lane departure warning, traffic jam piloting, and autonomous parking, to fully autonomous features, e.g., intersection autonomy. Automobile manufacturers are also facing increasing regulations for automobile software and electrical/electronic architectures, such as safety standards, $CO_2$ emissions objectives, data management and protection of personal data (not to mention risks of liability for accidents caused by these autonomous vehicle features), and mandatory cybersecurity upgrades. As a result, software in modern automobiles can contain millions of lines of code. As the capacity of ECUs and the number of sensors increases, ranging from multiple cameras to advanced technology, like LiDAR (light detection and ranging), the amount of software instructions utilized to support the ECUs is expected to grow. As the embedded software used in ECUs continues to increase in volume of code, complexity, and sophistication, managing the complexity and quantity of ECUs in a vehicle has become a key challenge for automobile manufactures, automotive support entities, and automobile owners.

In some cases, modern vehicles can be considered to be small edge/mesh networks, in which each ECU may be responsible for a single or a few tasks. The increasing user/operator expectations for ease/frequency of update and improved usability throughout the ECU (and vehicle) lifecycle is creating new requirements for the automotive industry. Historically, a manufacturer, when manufacturing the vehicle, might load all the applications that an ECU might need, and updates to the applications might require a visit to an automotive dealer or mechanic. This approach, however, does not scale well. As new updates (e.g., software updates) are available, either for improvements or fixes, scheduling a visit for a software update may be both time-consuming and expensive. This can lead to safety and/or performance issues if an automobile owner postpones a critical update due to cost or scheduling reasons.

One solution to this problem is over-the-air (OTA) updates. An OTA update is an update that is performed utilizing a network connection of the automobile. For example, the automobile may include a network interface that is capable of connecting to the automobile manufacturer (e.g., over the internet and/or the cloud). Using the network interface, a software update may be downloaded and installed on one or more ECUs. The software update may be, for example, a data file that includes the software application that is to be installed in a given ECU to update its functionality. However, the network connectivity to download such a software application may be difficult to maintain. In some cases, the signal power required to access a network such as the internet may be expensive, and may not be universally available. The complexity of OTA updates may provide a challenge that manifests more evidently in environments with limited connectivity (or in devices that, for security reasons, cannot open connections towards remote destinations).

The present disclosure addresses the above-noted and other deficiencies by utilizing network connections between vehicles to provide access to the update files that may be utilized to update one or more ECUs. For example, a first vehicle may detect the proximity of a second vehicle and attempt to establish a network connection to the second vehicle. The network connection may be utilized to transfer an ECU software update between the two vehicles. For example the first vehicle may request one or more ECU software update files from the second vehicle. In some embodiments, the ECU software update files may be applications that are already installed and/or executing on the second vehicle.

In some embodiments, the update transfer between the two vehicles may be further augmented to improve the safety and/or quality of the update. For example, in some embodiments, the first vehicle may examine information about the ECU software update file, such as an installation history, before installing the ECU software update. As a non-limiting example, the first vehicle may only transfer and/or install ECU software updates that have been installed on the second vehicle for a threshold amount of time. In some embodiments, the threshold amount of time may be adjusted based on environmental data, which may include weather information and/or planned routes of the first vehicle.

In some embodiments, before performing the transfer, a compatibility between the first vehicle and the second vehicle may be established. For example, identification numbers and/or other identifying information of the first and second vehicle may be exchanged with an administrative device configured to determine a compatibility of the two vehicles. The use of the administrative device may allow for the cloud-based communication utilized to confirm the update to be reduced to a very small and quick transaction, while still allowing for the compatibility to be quickly adjusted if needed. For example, rather than programming every vehicle to know with which vehicles it is compatible, which may change over time, the use of a cloud-based communication will allow for the administrative device to provide the information related to compatibility dynamically.

Embodiments of the present disclosure may provide a technological solution that increases the security of the operation of embedded systems, such as those used in computing devices for vehicles. By facilitating trusted updates that may be accomplished with no, or minimal, connectivity to cloud-based systems, embodiments of the present disclosure may allow for increased access to computer updates. Providing more frequent, and more accessible, computer updates allows for the operations of the vehicular computer systems to be updated and/or repaired more quickly, improving the operations of the device. Moreover, in situations where a software update may include a security upgrade, embodiments of the present disclosure may provide a more secure environment by allowing for the security of a vehicle to updated more quickly, so that potential security vulnerabilities are reduced and/or prevented. Embodiments of the present disclosure may allow for the functionality of vehicular computer systems, such as ECUs, to be kept current without requiring more intrusive methods, such as a recall and/or a trip to an authorized repair center.

FIG. 1 is a schematic block diagram that illustrates an example system 100, according to some embodiments of the present disclosure. FIG. 1 and the other figures may use like reference numerals to identify like elements. A letter after a reference numeral, such as "115A," indicates that the text refers specifically to the element having that particular reference numeral. A reference numeral in the text without a following letter, such as "115," refers to any or all of the elements in the figures bearing that reference numeral.

As illustrated in FIG. 1, the system 100 includes a first vehicle 115A, a second vehicle 115B, an update repository 120, and an administrative device 130. The first vehicle 115A may be coupled to the administrative device 130 (e.g., may be operatively coupled, communicatively coupled, may communicate data/messages with each other) via a first network 140A. The second vehicle 115B may be coupled to the update repository 120 (e.g., may be operatively coupled, communicatively coupled, may communicate data/messages with each other) via a second network 140B. Networks 140 may be a public network (e.g., the internet), a private network (e.g., a local area network (LAN) or wide area network (WAN)), or a combination thereof. In one embodiment, the networks 140 may include a wired or a wireless infrastructure, which may be provided by one or more wireless communications systems, such as a WiFi™ hotspot connected with the networks 140 and/or a wireless carrier system that can be implemented using various data processing equipment, communication towers (e.g., cell towers), etc. In some embodiments, the networks 140 may be an L3 network. The first network 140A may carry communications (e.g., data, message, packets, frames, etc.) between the first vehicle 115A and the administrative device 130. The second network 140B may carry communications (e.g., data, message, packets, frames, etc.) between the second vehicle 115B and the update repository 120. In some embodiments, the first network 140A and the second network 140B may be a same network 140. In some embodiments, the first network 140A and the second network 140B may be different networks 140, including different types of networks 140, from one another.

Each vehicle 115 may include one or more ECUs 116, which may be computing devices. An ECU 116 may include electronic circuits and/or input/output (I/O) interfaces configured to interface with one or more portions of the vehicle 115. In some embodiments, the ECU 116 may include hardware such as processing device 122 (e.g., processors, central processing units (CPUs), memory 124 (e.g., random access memory (e.g., RAM), storage devices (e.g., hard-disk drive (HDD), solid-state drive (SSD), etc.), and other hardware devices (e.g., sound card, video card, etc.).

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as a microcontroller, an application specific integrated circuit (ASIC), a field programmable gate array (FPGA), a digital signal processor (DSP), network processor, or the like.

Memory 124 may include volatile memory devices (e.g., random access memory (RAM)), non-volatile memory devices (e.g., flash memory) and/or other types of memory devices. As a non-limiting example, the non-volatile memory may include a read-only memory (ROM), a programmable read-only memory (PROM), an erasable programmable read-only memory (EPROM), an electrically erasable programmable read-only memory (EEPROM), or a flash memory In certain implementations, memory 124 may be non-uniform access (NUMA), such that memory access time depends on the memory location relative to processing device 122. In some embodiments, memory 124 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 124 may be configured for long-term storage of data and may retain data between power on/off cycles.

The ECU 116 may be a computing device installed and/or present in the vehicle 115. In some embodiments, the ECU 116 may be a part of an automobile, though the embodiments of the present disclosure are not limited to such a configuration. The ECU 116 may include an application 117.

The application 117 may include computer instructions configured to execute (e.g., on processing device 122) one or more functions. The functions of the application 117 of the ECU 116 may be utilized to operate, control, and/or monitor portions of the vehicle 115. In some embodiments, the application 117 may be provided as firmware.

The application 117 of the various ECUs 116 may take one of several formats. For example, one or more of the ECUs 116 may be an Engine Control Module (ECM) including an application 117 that may monitor and control various functions of an internal combustion engine, e.g., fuel injection, ignition timing, and idle speed control system of the vehicle 115. All of these functions may rely on data, e.g., engine coolant temperature, air flow, and crank position, that can be received from various sensors. An ECM may also store the values of sensors and actuators in battery-backed memory as the vehicle 115 is driven over time.

As another example, one or more of the ECUs 116 may be a Powertrain Control Module (PCM) including an application 117 that may monitor and control such features as speed control, air conditioning, battery charging, and shifting of an automatic transmission of the vehicle 115. The inputs provided to a PCM may include a throttle position sensor, output shaft speed sensor, vehicle speed sensor, engine RPM sensor, brakes, cruise control, and ignition. Speed governors may also make use of the PCM.

As another example, one or more of the ECUs 116 may be a Vehicle Control Module (VCM) including an application 117 that may control such functions as electronic power steering, adaptive cruise control, airbags, and electronic stability control systems of the vehicle 115. A VCM can take inputs from crash sensors (accelerometers), in addition to sensors that detect occupant weight, seating position, seat belt use, and seat position to determine the force with which, in the event of an accident, the air bags should deploy. A VCM may also take inputs from steering wheel angle sensors, wheel speed sensors, yaw rate sensors, and lateral acceleration sensors to provide an optimum driving experience.

As illustrated in FIG. 1, both the first vehicle 115A and the second vehicle 115B may include multiple ECUs 116. For example, different ECUs 116 may perform different functions within the vehicle 115. The number of ECUs 116 illustrated in FIG. 1 is merely for descriptive purposes, and is not intended to limit the embodiments of the present disclosure.

In some embodiments, the vehicles 115 may include an ECU controller 110. The ECU controller 110 may be responsible for monitoring and/or administering the ECUs 116. For example, the ECU controller 110 may be configured to communicate with each of the ECUs 116 to, among other things, issue commands and/or provide additional information related to the vehicle 115. The ECU controller 110 may have a processing device 122 and memory 124 in a similar manner as the ECUs 116. In some embodiments, the type and/or configuration of the processing device 122 and memory 124 may be different than that of the ECUs 116.

In FIG. 1, the first vehicle 115A is illustrated as having a first ECU controller 110A and the second vehicle 115B is illustrated as having a second ECU controller 110B, but this is merely an example, and is not intended to limit the embodiments of the present disclosure. Though illustrated as separate entities in FIG. 1, the ECU controller 110 may be, in some embodiments, another type of ECU 116. In some embodiments, the functions described for the ECU controller 110 may be distributed across multiple ECUs 116.

The ECU controller 110 may include an update engine 134 that is configured to monitor and/or maintain the applications 117 of the ECUs 116. For example, the update engine 134 of the ECU controller 110 may be configured to manage updates of the applications 117 executing on the ECUs 116 through the provisioning and/or installation of application updates 195. The update engine 134 of the ECU controller 110 may be configured to distribute the application updates 195 to respective ones of the ECUs 116 to update the applications 117 of the ECUs 116.

As described in some embodiments, the applications 117 may be software executing on the processing device 122 from the memory 124 of the ECU 116. In some embodiments, to update the application 117, an application update 195 may be copied and/or executed that replaces the application 117 on the ECU 116. For example, the computer instructions associated with the application 117 may be stored in a non-volatile storage of the ECU 116, such as the memory 124. In some embodiments, updating the application 117 may include replacing the copy of the application 117 stored on the ECU 116, and restarting the application 117 from the newly-copied version. In some embodiments, the application updates 195 may be, or may contain, the updated application 117. In some embodiments, the application updates 195 may include additional instructions (e.g., computer instructions executable by the processing device 122 of the ECU 116 and/or the ECU controller 110) that may be executed to perform the update of the application 117.

In some embodiments, the update engine 134 may be configured to store the application updates 195 within an update store 132. For example, in some embodiments, the update store 132 may be a part of the memory 124 of the ECU controller 110. In some embodiments, the ECU controller 110 may be configured to maintain an application update 195 for one or more of the ECUs 116 of the vehicle 115. For example, once an application 117 has been installed on an ECU 116, the application update 195 that was utilized to update the application 117 may remain in the update store 132. As will be described further herein, the ECU controller 110 may be configured to differentiate between application updates 195 that have already been installed on an ECU 116 of the vehicle 115, and an application update 195 that has not yet been installed on an ECU 116 of the vehicle 115.

In some embodiments, the update engine 134 of the ECU controller 110 may maintain update metadata 196 that describes and/or corresponds to each of the applications 117 and/or the application updates 195. The update metadata 196 may describe the application update 195 and/or a state of the application 117 associated with an application update 195 within one or more of the ECUs 116 of the vehicle 115. For example, in some embodiments, the update metadata 196 may include application metadata 198 associated with each of the applications 117 of the ECUs 116.

As a non-limiting example, the application metadata 198 may include data that describes a particular application 117, the ECU 116 upon which the application 117 executes, the application update 195 that is utilized to update and/or install the application 117, and the like. For example, the application metadata 198 for a given application 117 may include a device identifier (ID) that is associated with the ECU 116 upon which the application 117 executes. For example, the device ID may be a model or registration number of the particular ECU 116. The device ID may identify particular characteristics of the ECU 116 that may be utilized to determine compatibility of one ECU 116 with another ECU 116.

In some embodiments, the application metadata 198 may include a version ID of the application 117. In some embodiments, the version ID may be a numeric value that uniquely identifies a particular version of the application 117. Different versions of the application 117 may include different functions, different computer instructions, and/or different functionalities.

In some embodiments, the application metadata 198 may include an update timestamp. In some embodiments, the update timestamp may indicate a date on which a particular update was created. As an example, when the instructions of an application 117 are changed, such that an application update 195 is created, a new computer executable may be generated. The new computer executable representing the updated application 117 may be given a new (e.g., incremented) version ID, and the time and/or date on which the update application 117 was generated may be utilized to form the update timestamp. By examining the version ID and/or the update timestamp, two applications 117 may be compared. For example, if the version IDs of two applications 117 are different, it may be determined that the instructions and/or functionalities of the two applications 117 are different. In addition, if the update timestamps of the two applications 117 are different, it may be determined that the instructions and/or functionalities of the two applications 117 are different. Moreover, application metadata 198 associated with an application 117 having a newer (e.g., more recent in time) update timestamp may be determined to be a more recent version of the application 117. Thus, by looking at the application metadata 198 associated with two different applications 117, it can be determined if the applications 117 are different, and whether one is more recent than the other.

In some embodiments, the application metadata 198 may include an install timestamp 188. In some embodiments, the install timestamp 188 may indicate a date on which an application 117 that is associated with the application metadata 198 was installed on the ECU 116 that is associated with the device ID of the application metadata 198. It will be understood that the install timestamp 188 may be different from the update timestamp. For example, a particular application update 195 may generated at a first point in time, but not be installed on a particular ECU 116 until later in time. The install timestamp 188 may provide an indication of how long a particular application has been executing on an ECU 116. In some embodiments, if a particular application update 195 has not yet been installed on an ECU 116, its install timestamp 188 may be zero or other invalid value, to provide an indication that it has not yet executed on the vehicle 115.

The elements of the application metadata 198 described herein are not intended to limit the embodiments of the present disclosure. In some embodiments, the application metadata 198 may include additional information that may be utilized to identify and/or otherwise describe the applications 117 and/or application updates 195 of the vehicle 115. Similarly, the update metadata 196 described herein may include additional information beyond the application metadata 198. For example, in some embodiments, the update metadata 196 may include additional information about the ECUs 116, the vehicle 115, and/or other operating conditions of the update engine 134. In some embodiments, the update metadata 196 may include an install threshold 197, details of which will be described further herein.

In some embodiments, the application updates 195 may be retrieved from the update repository 120. The update repository may be a storage device that maintains and/or stores a plurality of application updates 195. The update repository 120 may, in some embodiments, be accessible over a network, such as network 140B as illustrated in FIG. 1. As a non-limiting example, in some embodiments, the update repository 120 may be a network-accessible storage that may be maintained by a manufacturer of the vehicle 115. In some embodiments, the network 140B between the vehicle 115 and the update repository 120 may be a network such as a wireless network that allows non-wired connectivity between the vehicle 115 and the update repository 120. As an example, the update repository 120 may be accessible via the internet, and the network 140B may be a cloud-based network that allows the vehicle 115 (e.g., the second vehicle 115B in FIG. 1) to access the update repository 120 remotely.

The use of a wireless network for network 140B is merely an example, and the embodiments of the present disclosure are not limited to such a configuration. In some embodiments, the network 140B between the vehicle 115 and the update repository 120 may be a wired connection. As an example, the update repository 120 may be a storage that is maintained at a vehicle manufacturer and/or dealer that is associated with the vehicle 115. To obtain the network 140B, the vehicle (e.g., the second vehicle 115B in FIG. 1) may be moved to the location of the update repository 120 and plugged into the update repository 120 to provide a wired network 140B. Other appropriate networks 140B between the vehicle 115 and the update repository 120 may be utilized without exceeding the scope of the present embodiments.

The update repository 120 may include application updates 195 for a plurality of applications 117, including applications which are not present on the ECUs 116 of the vehicle 115. Thus, the update engine 134 may be configured to connect to the update repository 120 to access the list of potential application updates 195. The update engine 134 may be configured to determine, from the available application updates 195 that are present on the update repository 120, which application updates 195 are compatible with the ECUs 116 of the vehicle 115. For example, the update engine 134 may be configured to analyze metadata (such as application metadata 198) associated with each of the application updates 195 of the update repository 120 to determine if a particular application update 195 is compatible with the ECUs 116 of the vehicle 115 (e.g., by analyzing the device id of the application metadata 198).

The update engine 134 may be configured to download appropriate application updates 195 from the update repository 120, and install the application updates 195 to the respective appropriate ECUs 116 to update the applications 117 of the ECUs 116. As noted herein, in some cases, the access of the update repository 120 may be performed over a wireless network 140B that may access a cloud network in which the update repository 120 resides. Such updates may be considered as over-the-air (OTA) updates. OTA updates may allow for the applications 117 of the ECUs 116 to be kept current, which may improve the reliability and/or functionality of the ECUs 116.

However, in some embodiments, the update repository 120 may not be available, or may be available with only limited connectivity. For example, in FIG. 1, it is illustrated that the second vehicle 115B has a connection to the update repository 120 over network 140B, but the first vehicle 115A does not have a connection to the update repository 120 over network 140B. This is a schematic example to illustrate that the second vehicle 115B may have a better connection (e.g., better signal reception) or a better location with respect to a wireless signal so as to access the wireless network 140B. As another example, the first vehicle 115A may be able to access the network 140B, but may have a connection that does not support enough bandwidth to access multiple copies of the application updates 195 that are available on the update repository 120. Thus, the size of application updates 195 may be such that an amount of network bandwidth (e.g., over network 140B) may be significant.

In some embodiments of the present disclosure, the first vehicle 115A may be able to access application updates 195 from the second vehicle 115B directly, utilizing communication over a wireless network 145 between the two vehicles 115. As an example, each of the first vehicle 115A and the second vehicle 115B may respectively contain an antenna infrastructure capable of sending and receiving wireless communications between and among vehicles 115. The wireless network 145 may be of a shorter range than the wireless networks 140 described herein. For example, the wireless network 145 may be part of a vehicular ad hoc network (VANET). An example of a VANET includes a vehicle-to-vehicle (V2V) network. For example, in a V2V network 145, each vehicle 115 may act as a node that forms a part of a larger communication system that does not rely upon pre-existing communications infrastructure. The V2V network 145 was implemented by the National Highway Traffic Safety Administration (NHTSA) as part of new Federal Motor Vehicle Safety Standard (FMVSS). One proposed implementation mechanism for the V2V network 145 includes a short-range communications device that operates on wireless communication channels at 5.9 GHz in something known as device-to-device (D2D) communication, such as that implemented by the IEEE 802.11p DSRC standard. It will be understood that other types of wireless networks 145 may be utilized between the first vehicle 115A and the second vehicle 115B without deviating from the embodiments of the present disclosure.

Utilizing the network 145 the first vehicle 115A may query the second vehicle 115B for compatible application updates 195. If application updates 195 are found on the second vehicle 115B that are compatible with the ECUs 116 of the first vehicle 115A, the first vehicle 115A may request the application updates 195 from the second vehicle 115B. In some embodiments, the first vehicle 115A may request and utilize the update metadata 196 of the second vehicle 115B to determine which application updates 195 to request. In some embodiments, the first vehicle 115A may select from application updates 195 of the second vehicle 115B that are associated with applications 117 that are installed on ECUs 116 of the second vehicle 115B.

Figure 2:
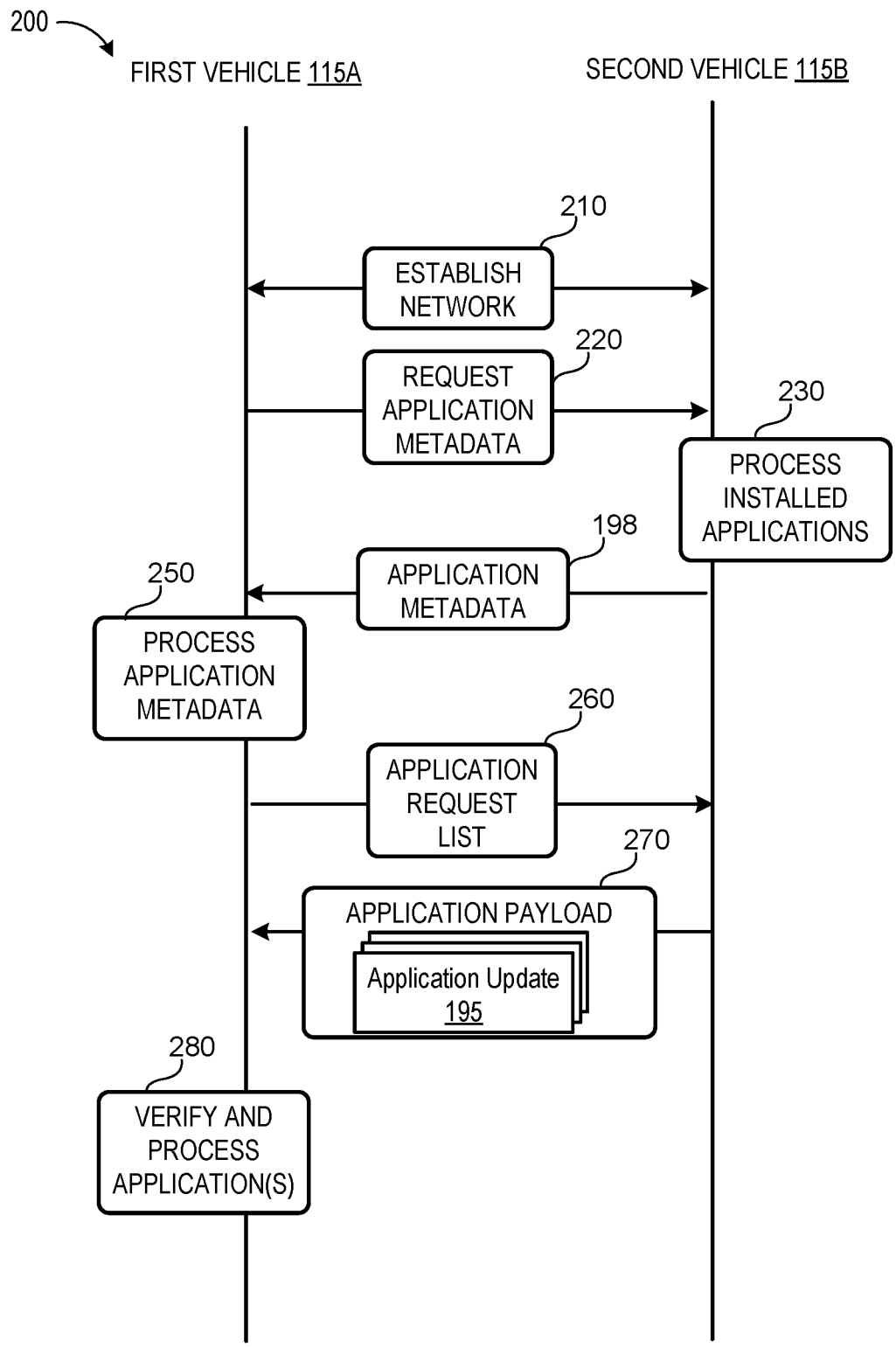
FIG. 2 is a schematic flow diagram that illustrates a transfer of one or more application updates between vehicles, according to some embodiments of the present disclosure.

FIG. 2 is a schematic flow diagram that illustrates a transfer 200 of one or more application updates 195 between vehicles 115, according to some embodiments of the present disclosure. A description of elements of FIG. 2 that have been previously described will be omitted for brevity.

Referring to FIGS. 1 and 2, an operation to transfer application updates 195 between vehicles 115 may begin with establishing 210 a network 145 between the two vehicles 115. For example, in some embodiments, a first vehicle 115A may detect a second vehicle 115B, and establish a wireless network 145 between the first vehicle 115A and the second vehicle 115B. In some embodiments, establishing 210 the network 145 may be a result of one or more wireless broadcast messages from the first vehicle 115A and/or the second vehicle 115B. For example, one or more of the first vehicle 115A and the second vehicle 115B may broadcast an omni-directional message wirelessly that may be received by the other vehicle 115. Reception of the omni-directional message may indicate to one or both of the vehicles 115 that another vehicle 115 is in wireless communication range. Upon receipt of an initial message, the vehicles 115 may handshake to establish the network 145. Establishment of the network 145 may follow known VANET protocols, such as V2V, Vehicle-to-everything (V2X), visible light communication (VLC), Zigbee, Worldwide Interoperability for Microwave Access (WiMAX), and the like.

Once the network 145 is established, the first vehicle 115A may request 220 application metadata 198 from the second vehicle 115B over the network 145. In some embodiments, the request 220 may be for application metadata 198 that are associated with any application updates 195 that may be present on the second vehicle 115B and available for transfer to the first vehicle 115A over the network 145.

In response to the request 220, the second vehicle 115B may process 230 the application 117 that are installed on the ECUs 116 of the second vehicle 115B. In some embodiments, the second vehicle 115B may generate a set of application metadata 198 that are associated with any of the applications 117 that are installed on the ECUs 116 of the second vehicle 115B for which the second vehicle 115B has application updates 195. In some embodiments, the second vehicle 115B may generate a set of application metadata 198 for any application updates 195 that are present on the second vehicle 115B. For example, in some embodiments, the second vehicle 115B may contain application updates 195 which have not been installed on ECUs 116 of the second vehicle 115B, but may nonetheless be available for transfer to other vehicles 115.

The second vehicle 115B may transfer the application metadata 198 to the first vehicle 115A over the network 145. The application metadata 198 that is transferred may provide a list of the application updates 195 that are available on the second vehicle 115B.

The first vehicle 115A may process 250 the application metadata 198 and generate an application request list 260 based on the application metadata 198. The application request list 260 may include a list and/or metadata that correspond to application updates 195 for the applications 117 referenced by the application metadata 198 transferred from the second vehicle 115B that the first vehicle 115A wishes to request from the second vehicle 115B. The first vehicle 115A may transfer the application request list 260 to the second vehicle 115B over the network 145.

In response to the application requestion list 260, the second vehicle 115B may transfer an application payload 270 to the first vehicle 115A. The application payload 270 may include one or more of the application updates 195 that were requested as part of the application request list 260. In some embodiments, the application updates 195 of the application payload 270 may be transmitted sequentially from the second vehicle 115B to the first vehicle 115A over the network 145. In some embodiments, the application updates 195 may be archived together and compressed as part of constructing the application payload 270 for transmission to the first vehicle 115A over the network 145.

After receiving the application payload 270, the first vehicle 115A may separate out the one or more application updates 195 for verification and processing 280. Verification may include validation of a signature of the application updates 195. For example, the first vehicle 115A may have a public signature associated with the second vehicle 115B, and the verification of the application update 195 may include the use of a dual-key decryption with respect to the application update 195 to verify its contents. In some embodiments, the application update 195 may be signed by a vendor of the vehicle 115. For example, each vehicle 115 may have a vendor public key pre-installed which may be utilized to verify and trust application updates 195 transferred by vehicles 115 of the particular vendor. It will be recognized that other types of integrity checks may be performed on the application updates 195 to verify their integrity. For example, checksums, which may be signed, may be utilized to validate that the application update 195 is complete.

Once the application updates 195 are verified, they may be processed, which may include installation. Upon receipt of the application updates 195 from the second vehicle 115B, the first vehicle 115A may perform various options with the application updates 195. In some embodiments, the first vehicle 115A may defer the installation of the application updates 195 to another moment in time. For example, the first vehicle 115A may wait and/or delay until the first vehicle 115A is not moving (e.g., stationary), such as when it is parked or recharging. In some embodiments, the first vehicle 115A may install the application updates 195 in the order they were received. Installing an application update 195 with respect to a particular ECU 116 may result in a replacement and/or update of the application 117 on the given ECU 116.

In some embodiments, the first vehicle 115A may redistribute the application updates 195 of the application payload 270. For example, the first vehicle 115A may decline to install the application updates 195, but may instead store the application updates 195 in its update store 132 for potential distribution to other vehicles 115.

The communication between the first vehicle 115A and the second vehicle 115B described in FIG. 2 may occur primarily or solely over the wireless network 145 between the two vehicles 115. Since both vehicles 115 may be moving during the transfer, it may be possible that a distance between the vehicles 115 becomes too great to sustain the network 145 between the vehicles 115. As a result, the communications illustrated in FIG. 2 over the network 145 may be best effort, and the protocol may be implemented to tolerate failures. For example, the transfer of the application payload 270 may wait for the entire application payload 270 to be transferred before processing 280 any of the application updates 195, to allow for the possibility of failures. In some embodiments, a partial transfer of the application payload 270 may be tolerated. For example, if the application updates 195 are sent serially, the first vehicle 115A may process 280 any application updates 195 that are received, even if the full application payload 270 was not received before the network 145 disconnected.

As described with respect to FIG. 2, the first vehicle 115A may process 250 the application metadata 198 from the second vehicle 115B to create the application request list 260 of the application updates 195 that the first vehicle 115A wishes to receive. Thus, the first vehicle 115A may select less than all of the application updates 195 that are available for distribution from the second vehicle 115B. In some embodiments, the processing 250 of the application metadata 198 may be based on various criteria.

Figure 3A:
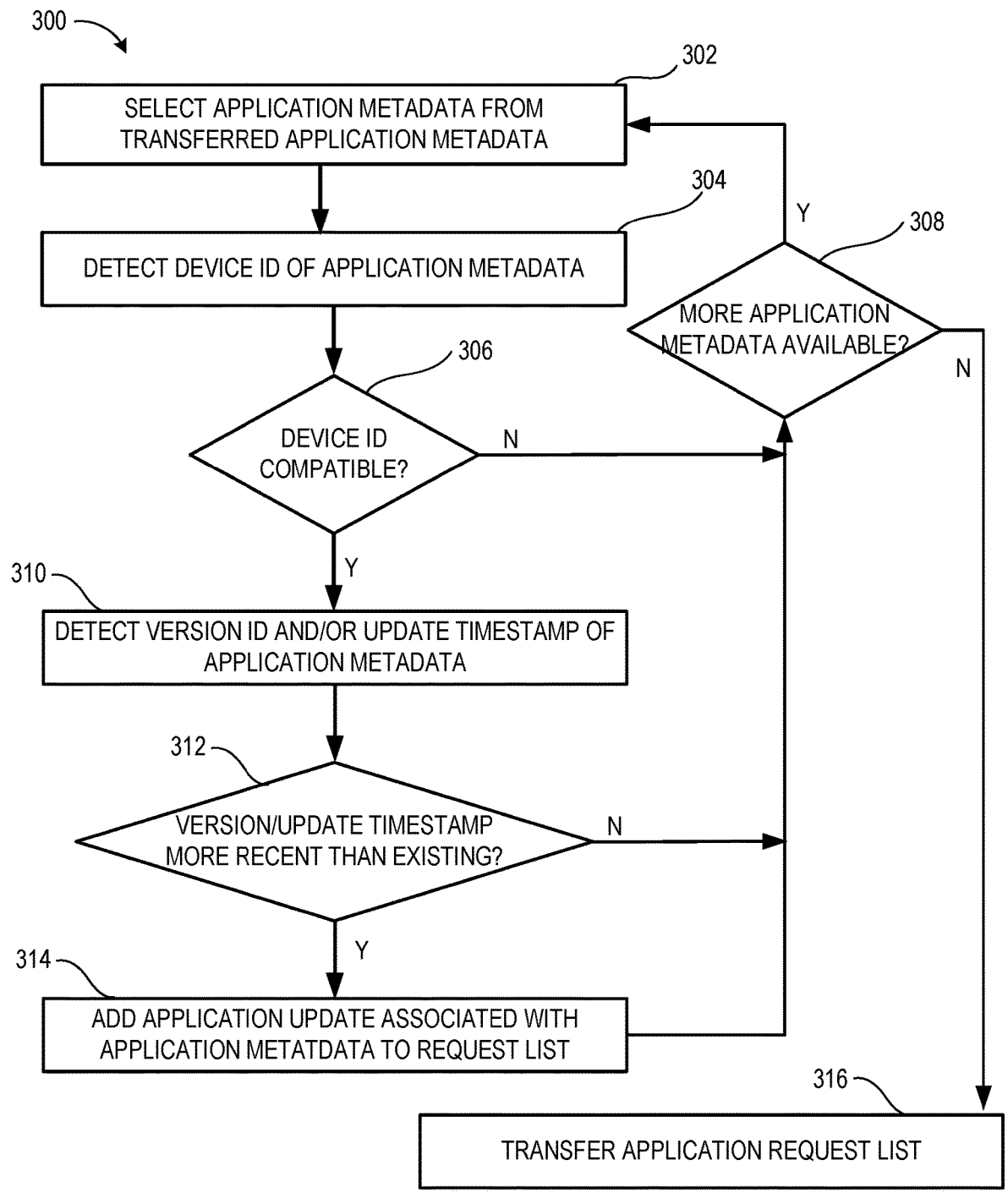
FIG. 3A is a flow diagram of a method of processing application metadata to create an application request list, according to some embodiments of the present disclosure.

FIG. 3A is a flow diagram of a method 300 of processing application metadata 198 to create an application request list 260, according to some embodiments of the present disclosure. A description of elements of FIG. 3A that have been previously described will be omitted for brevity. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., ECU controller 110).

With reference to FIG. 3A, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

In some embodiments, the method 300 may be utilized on a first vehicle 115A as part of processing 250 (see FIG. 2) application metadata 198 that is received from a second vehicle 115B. Referring simultaneously to FIGS. 1, 2, and 3A as well, the method 300 begins at block 302, in which an individual application metadata 198 is selected from the set of application metadata 198 transferred from the second vehicle 115B. As previously described, the set of application metadata 198 transferred from the second vehicle 115B may indicate the one or more application updates 195 that are available on the second vehicle 115B for transfer to the first vehicle 115A over the network 145.

At block 304, a device ID of the application metadata 198 may be detected. The device ID may indicate compatibility of a given ECU 116 with the application update 195 corresponding to the application metadata 198. For example, the device ID may be a model number, or a plurality of model numbers, that indicate models of ECU 116 that are compatible with the corresponding application update 195.

At block 306, it may be determined if the device ID from the application metadata 198 is compatible with one or more ECUs 116 of the first vehicle 115A. For example, it may be determined if the device ID is, or contains, a same model number as any of the ECUs 116 of the first vehicle 115A. As another example, a compatibility table may be maintained by the first vehicle 115A that may allow it to perform a lookup to verify compatibility between a given device ID of the application metadata 198 and any ECU 116 of the first vehicle 115A. If the application metadata 198 is compatible with the one or more ECUs 116, it may mean that an application update 195 represented by the application metadata 198 may be installed on the one or more ECUs 116 such that the associated application 117 may run without error.

If the device ID is determined to be incompatible with any of the ECUs 116 of the first vehicle 115A (block 306: N), operations may transfer to block 308 in which it is determined whether there are further application metadata 198 to be processed. If additional application metadata 198 are available (block 308: Y), the operations may revert to block 302 in which another application metadata 198 is selected from the set of application metadata 198 transferred by the second vehicle 115B. If there are no further application metadata 198 to be processed (block 308: N), the method 300 may transfer to block 316 where any application request list 260 that has been constructed may be transferred to the second vehicle 115B over the network 145, as described with respect to FIG. 2.

If the device ID is determined to be compatible with any of the ECUs 116 of the first vehicle 115A (block 306: Y), operations may continue to block 310 in which a version ID and/or an update timestamp of the application metadata 198 may be detected. The version ID may indicate a particular version of the application update 195 corresponding to the application metadata 198. For example, the version ID may be a numeric value (e.g., 2.1). The update timestamp may be a time at which the application update 195 corresponding to the application metadata 198 was created (e.g., a creation date).

At block 312, it may be determined if the version ID and/or the update timestamp is more recent than an existing version ID and/or update timestamp of the application 117 of the ECU 116 that is compatible with the application metadata 198 transferred from the second vehicle 115B. For example, it may be determined if the version ID is more recent (e.g., is a higher number) than a version ID associated with the application 117 of the compatible ECU 116 of the first vehicle 115A. As illustrated in FIG. 1, the ECU controller 110 may maintain its own application metadata 198 for the applications 117 that are executing on the ECUs 116 of the first vehicle 115A. The ECU controller 110 may compare the version ID of the application metadata 198 transferred from the second vehicle 115B to the application metadata 198 for the applications 117 that are executing on the ECUs 116 of the first vehicle 115A to determine if the application update 195 associated with the application metadata 198 from the second vehicle 115B is more current than the application 117 that is already installed on the ECU 116 of the first vehicle 115A based on the version ID.

As another example, it may be determined if the update timestamp is more recent (e.g., is more recent in time) than an update timestamp associated with the application 117 of the compatible ECU 116. The ECU controller 110 may compare the update timestamp of the application metadata 198 transferred from the second vehicle 115B to the application metadata 198 for the applications 117 that are executing on the ECUs 116 of the first vehicle 115A to determine if the application update 195 associated with the application metadata 198 from the second vehicle 115B is more current than the application 117 that is already installed on the ECU 116 of the first vehicle 115A based on the update timestamp.

If the version ID and/or update timestamp is determined to be less recent (e.g., older) than what is already installed on the compatible ECU 116 of the first vehicle 115A (block 312: N), operations may transfer to block 308 in which it is determined whether there are further application metadata 198 to be processed, as described herein.

If the version ID and/or update timestamp is determined to be more recent (e.g., newer) than what is already installed on the compatible ECU 116 of the first vehicle 115A (block 312: Y), operations may continue to block 314 in which the application update 195 associated with the application metadata 198 is added to the application request list 260. Operations may then transfer to block 308 in which it is determined whether there are further application metadata 198 to be processed, as described herein.

The method 300 illustrated in FIG. 3A may allow for the ECU controller 110 to analyze potential application updates 195 available on the second vehicle 115B to determine if any should be transferred to the first vehicle 115A. By analyzing the application metadata 198 associated with the application updates 195 available on the second vehicle 115B to determine which of the application updates 195 are compatible and/or more current than what is already present on the ECUs 116 of the first vehicle 115A, a size of the potentially transferred application updates 195 may be reduced to those that are useful, which may reduce a bandwidth needed for the network 145 between the first vehicle 115A and the second vehicle 115B.

Figure 3B:
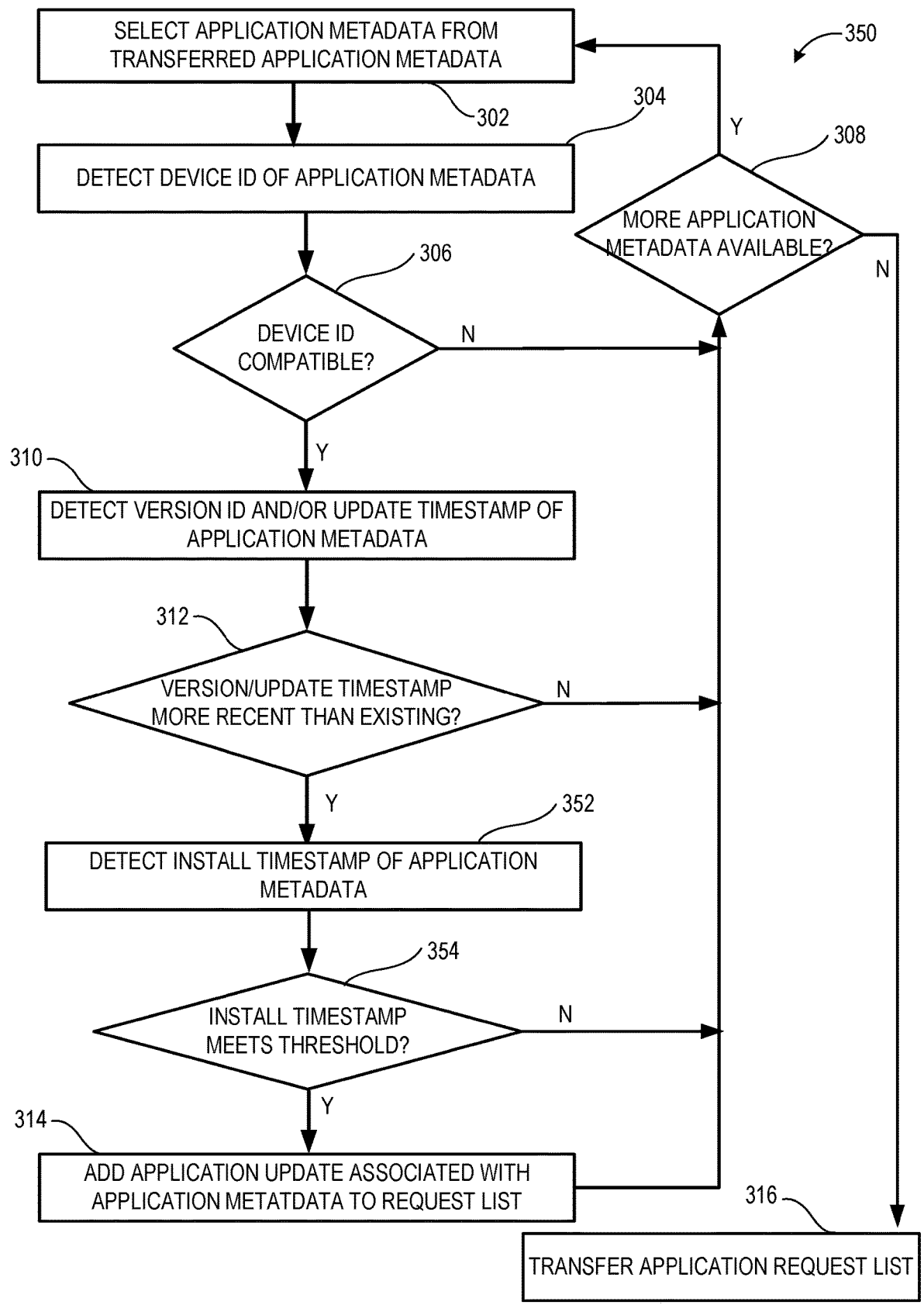
FIG. 3B is a flow diagram of another method of processing application metadata to create an application request list, according to some embodiments of the present disclosure.

The method 300 is merely an example, and other modifications may be made to the processing 250 (see FIG. 2) of the application metadata to create the application request list 260. In some embodiments, the selection of an application update 195 for installation may be based on a threshold install time on the second vehicle 115B. FIG. 3B is a flow diagram of another method 350 of processing application metadata 198 to create an application request list 260, according to some embodiments of the present disclosure. A description of elements of FIG. 3B that have been previously described will be omitted for brevity. Method 350 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 350 may be performed by a computing device (e.g., ECU controller 110).

With reference to FIG. 3B, method 350 illustrates example functions used by various embodiments. Although specific function blocks ("blocks") are disclosed in method 350, such blocks are examples. That is, embodiments are well suited to performing various other blocks or variations of the blocks recited in method 350. It is appreciated that the blocks in method 350 may be performed in an order different than presented, and that not all of the blocks in method 350 may be performed.

Operations 302, 304, 306, 308, 310, 312, 314, and 316 of method 350 may be substantially similar to those similarly-numbered operations described with respect to the method 300 of FIG. 3A. For example, the method 350 may include analyzing individual application metadata 198 of the set of application metadata 198 transferred from the second vehicle 115B to determine if the individual application metadata 198 is compatible with any ECU 116 of the first vehicle 115A and is more current than the already-running application 117 of the compatible ECU 116. As such a duplicate description of those operation will be omitted.

Referring simultaneously to FIGS. 1, 2, 3A, and 3B as well, the method 350 may further include operation 352, in which the install timestamp 188 of the application metadata 198 is detected. As previously described, the install timestamp 188 may indicate a time/date on which a given application 117 was installed on an ECU 116. Since the application metadata 198 being analyzed by the ECU controller 110 was provided by the second vehicle 115B, the install timestamp 188 of the application metadata 198 will indicate a time and/or date on which an ECU 116 of the second vehicle 115B installed and/or executed the application update 195 associated with the application metadata 198.

At operation 354, it may be determined if the install timestamp 188 of the application metadata 198 meets a particular install threshold 197 (see FIG. 1). The install threshold 197 may indicate a minimum duration over which an application 117 is to have executed on the second vehicle 115B before the ECU controller 110 of the first vehicle 115A will consider it for execution. As an example, the install threshold 197 may be thirty days. Thus, if the application metadata 198 indicates that a given application update 195 has an install timestamp 188 having a date that is more than thirty days in the past, it may meet the install threshold 197. In contrast, if the application metadata 198 indicates that a given application update 195 has an install timestamp 188 only a week in the past, it may not meet the install threshold 197.

In some embodiments, meeting the install threshold 197 may include a comparison to determine if the application metadata 198 indicates that a given application update 195 has an install timestamp 188 that is less than a particular duration. In some embodiments, an application update 195 that has been running for longer than a particular period of time may be avoided. For example, it may be known that application updates 195 older than a particular duration may have compatibility or functionality issues, and the install threshold 197 may be utilized to avoid such application updates 195.

The ECU controller 110 may compare the install timestamp 188 of the application metadata 198 transferred from the second vehicle 115B to the install threshold 197 to determine if the application update 195 associated with the application metadata 198 has been installed on the second vehicle 115B for a sufficient length of time to be considered for an update to the ECUs 116 of the first vehicle 115A.

If the install timestamp 188 is determined to not meet the install threshold 197 (block 354: N), operations may transfer to block 308 in which it is determined whether there are further application metadata 198 to be processed, as described herein.

If the install timestamp 188 is determined to meet the install threshold 197 (block 354: Y), operations may continue to block 314 in which the application update 195 associated with the application metadata 198 is added to the application request list 260. Operations may then transfer to block 308 in which it is determined whether there are further application metadata 198 to be processed, as described herein.

Method 350 may allow for additional precautions to be taken by the first vehicle 115A before an application update 195 from the second vehicle 115B is processed. By maintaining an install threshold 197, the first vehicle 115A may only transfer and/or install application updates 195 that have been executing for a threshold amount of time on the second vehicle 115B, even though those application updates 195 may be newer/more recent than what is currently executing on the ECUs 116 of the first vehicle 115A. The install threshold 197 may allow additional security by filtering out application updates 195 that are very recent and may not have had enough runtime to validate their functionality. For example, an application 117 that has been running only a few hours may be suspected of having errors (bugs) that have not yet been detected. In contrast, an application 117 that has been running for several months may have a higher likelihood of being error-free.

Figure 4:
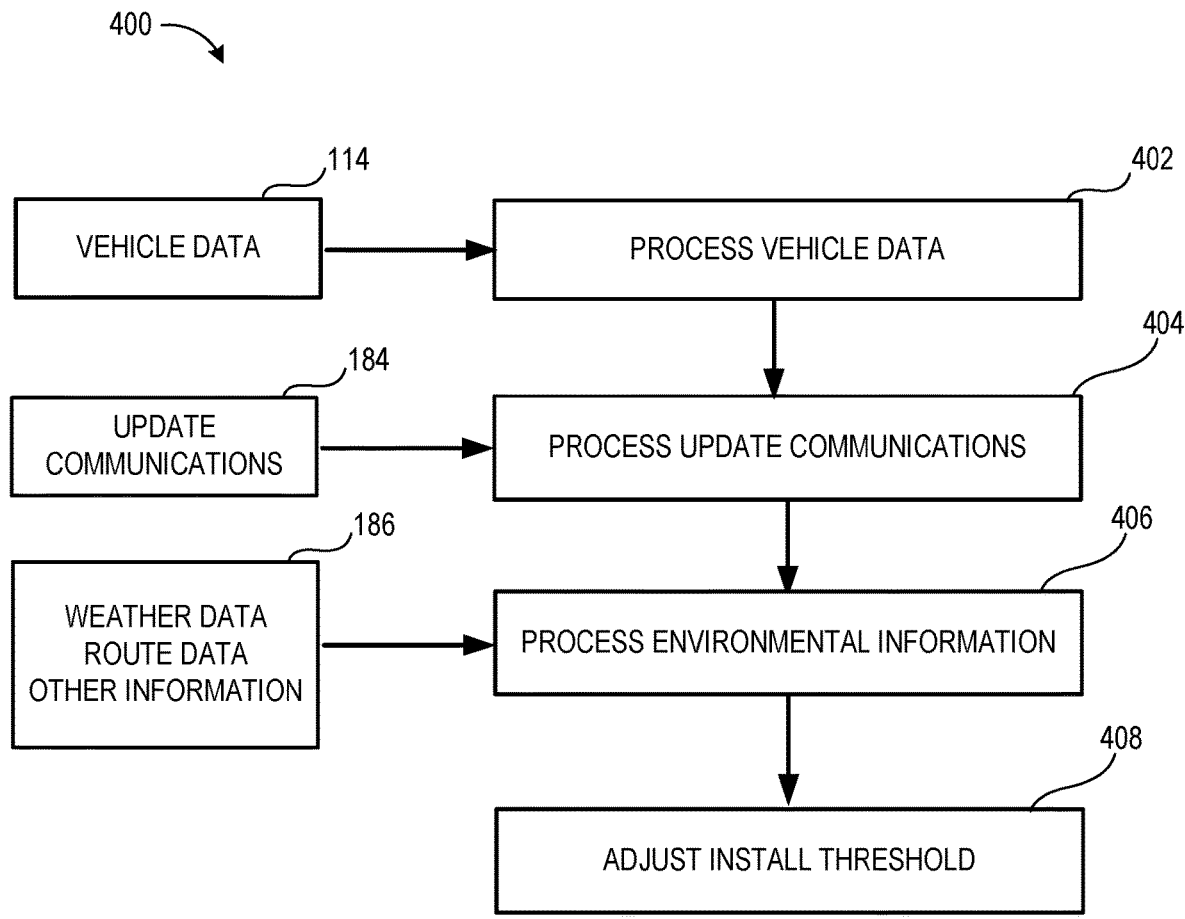
FIG. 4 is a flow diagram of a method for updating the install threshold used by a vehicle, in accordance with some embodiments of the present disclosure.

In some embodiments, it may be beneficial to dynamically adjust the install threshold 197. For example, the time period over which an application 117 must execute on the second vehicle 115B before being accepted for installation on the first vehicle 115A may be adjusted based on conditions to either accelerate, or delay, an application update 195. FIG. 4 is a flow diagram of a method 400 for updating the install threshold 197 used by a vehicle 115, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., ECU controller 110).

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring simultaneously to FIGS. 1 to 3B as well, the method 400 begins at block 402, in which vehicle data 114 is processed. As illustrated in FIG. 1, each vehicle 115 may include vehicle data 114. The vehicle data 114 may include, for example, a vehicle identifier 182. The vehicle identifier 182 may uniquely identify the vehicle 115. As an example, the vehicle identifier 182 may be, or include, a vehicle registration number. In some embodiments, the vehicle data 114 may include other types of information. For example, the vehicle data 114 may include a category or type of vehicle 115. In some embodiments, the vehicle data 114 may include whether the vehicle 115 is associated with operations that may require high stability. As an example, the vehicle data 114 may indicate if the vehicle 115 is involved in public services (e.g., a security drone, an ambulance, a police vehicle) or other categories, such as a military vehicle, that may indicate a higher desired level of stability for the vehicle 115.

As part of processing 402 the vehicle data 114, it may be determined if the install threshold 197 should be adjusted. For example, if the vehicle data 114 indicates that the vehicle 115 is associated with a category that indicates a higher desired level of stability, the install threshold 197 may be increased. In other words, for the first vehicle 115A to accept an application update 195 from the second vehicle 115, the application metadata 198 will indicate that the application update 195 has been installed on at least one ECU 116 of the second vehicle 115B for a period longer than the default install threshold 197. As an example only, if the first vehicle 115A is an emergency vehicle, the install threshold 197 may be increased from one month to two months.

Though the described example describes increasing the install threshold 197, embodiments of the present disclosure are not limited to this operation. In some embodiments, the vehicle data 114 may be processed to determine that the install threshold 197 should be decreased. For example, the vehicle data 114 may indicate that the first vehicle 115A is a test vehicle, and it may be desired to install updates as quickly as possible. As another example, the vehicle data 114 may indicate that the first vehicle 115A is a rental vehicle, and it may be desired to install features that may be important to customers as quickly as possible. As a result, in some embodiments, install threshold 197 may be dynamically altered to be shorter than the default install threshold 197. As an example only, if the first vehicle 115A is a test vehicle, the install threshold 197 may be decreased from one month to one week.

In some embodiments, processing 402 may determine the adjustment based on the vehicle data 114, but the embodiments of the present disclosure are not limited to this configuration. In some embodiments, the operator and/or owner of the first vehicle 115A may set the install threshold 197 to override a default install threshold 197. In some embodiments, the updated install threshold 197 as overridden by the operator and/or owner may be included as part of the vehicle data 114.

In operation 404, update communications 184 (see FIG. 1) may be processed. As illustrated in FIG. 1, the first vehicle 115A may receive update communications 184. The update communications 184 may indicate that some updates are to be processed more quickly or more slowly. As an example, the update communication 184 may indicate that an urgent application update 195 is available that addresses a critical functionality of the first vehicle 115A. Processing the update communication 184 may result in the install threshold 197 being lowered to a shorter amount of time, or even dropped to 0.

As another example, as a result of an error in the software supply chain related to a particular application update 195, an update communication 184 may indicate that the install threshold 197 should be set to be more recent (e.g., of a shorter duration) than a date on which the error occurred so that more recent application updates 195 may be selected and older application updates 195 may be avoided. As a result, the first vehicle 115A may avoid installing faulty application updates 195 that were installed during a period in which the software supply chain was faulty.

As illustrated in FIG. 1, the update communications 184 may be received by the first vehicle 115A over the network 140A. In some embodiments, the update communications 184 may be received from an administrative device 130. The administrative device 130 may be a computing device having a processing device 122 and memory 124 in a similar manner as the ECUs 116. In some embodiments, the type and/or configuration of the processing device 122 and memory 124 of the administrative device 130 may be different than that of the ECUs 116.

Referring back to FIG. 4, in operation 406, environmental data 186 is processed. As illustrated in FIG. 1, each vehicle 115 may include an environmental engine 118 that generates environmental data 186. The environmental data 186 may include, for example, weather data, route data, or other information related to the first vehicle 115A. As an example, the weather data may be accessed by sensors on the first vehicle 115A, but the embodiments of the present disclosure are not limited thereto. In some embodiments, the weather data may be retrieved from an external server, such as via network 140A. The weather data may include the present weather for the first vehicle 115A, or may include a future weather forecast for an area in which the first vehicle 115A is located. In some embodiments, a location to be used to determine the weather forecast may be provided by a sensor of the first vehicle 115A, such as a global positioning system (GPS) sensor of the first vehicle 115A.

The route data may include a current or future route of the first vehicle 115A. For example, the first vehicle 115A may be loaded with particular route information, such as a planned trip. In some embodiments, the route data may be an existing route with the first vehicle 115A is following. In some embodiments, the route data may include future planned routes, such as scheduled trips for the first vehicle 115A. The route data may include a destination of the route as well as a path be travelled by the first vehicle 115A.

The environmental data 186 may include other information, such as traffic information (e.g., in proximity to the first vehicle 115A and/or along a route of the first vehicle 115A), planned construction, important dates that may impact operation of the first vehicle 115A (e.g., holidays, weekends, etc.), or other information that may be relevant to the installation of an application update 195.

As part of processing 406 the environmental data 186, it may be determined if the install threshold 197 should be adjusted based on potential impacts to the operation of the first vehicle 115A due to the environmental data 186. For example, if the environmental data 186 indicates that the vehicle 115 should install updates more frequently (e.g., accept application updates 195 from the second vehicle 115B having a more recent install timestamp 188), the install threshold 197 may be reduced. As a non-limiting example, it may be determined that the second vehicle 115B has an application update 195 associated with an ECU 116 that provided services associated with an EBS (Electronic Brakes System). Further, it may be determined, based on the environmental data 186, that a weather forecast indicates an incoming storm. As a result, it may be determined that the install threshold 197 should be decreased to a smaller time window so the associated ECU 116 to be up-to-date before the storm is experienced. Similarly, the environmental data 186 may indicate that an upcoming route is to traverse an area with mountains or other difficult terrain. As a result, the install threshold 197 may be increased (e.g., require a longer installation time on the second vehicle 115B) to avoid updating any ECU 116 prior to the difficult handling unless the application update 195 has been installed for a longer period than the default.

In operation 408, the install threshold 197 may be adjusted based on the results of the operations 402, 404, 406 described herein. Each of the potential adjustments may be analyzed to determine a final install threshold 197. In some embodiments, each of the different analyses may be weighted differently. For example, an adjustment to the install threshold 197 as a result of the vehicle data 114 may have precedence over an adjustment related to the environmental data 186. The adjusted install threshold 197 resulting from operation 408 may be utilized in processing application updates 195, as described herein with respect to FIG. 3B.

Though the prior discussion as described a single install threshold 197, this is merely for ease of description. In some embodiments, a plurality of install thresholds 197 may be utilized. For example, in some embodiments, a different install threshold 197 may be utilized for each of the ECUs 116. For example, in some embodiments, one ECU 116 may require a longer install duration on the second vehicle 115B before being updated on the first vehicle 115A, while another ECU 116 may have a shorter install threshold 197. In some embodiments, if a plurality of install thresholds 197 are utilized, the respective install threshold 197 for a given application 117 and/or ECU 116 may be utilized when analyzing the application metadata 198 from the second vehicle 115B, as described herein, to determine if a particular application update 195 should be transferred from the second vehicle 115B.

Figure 5:
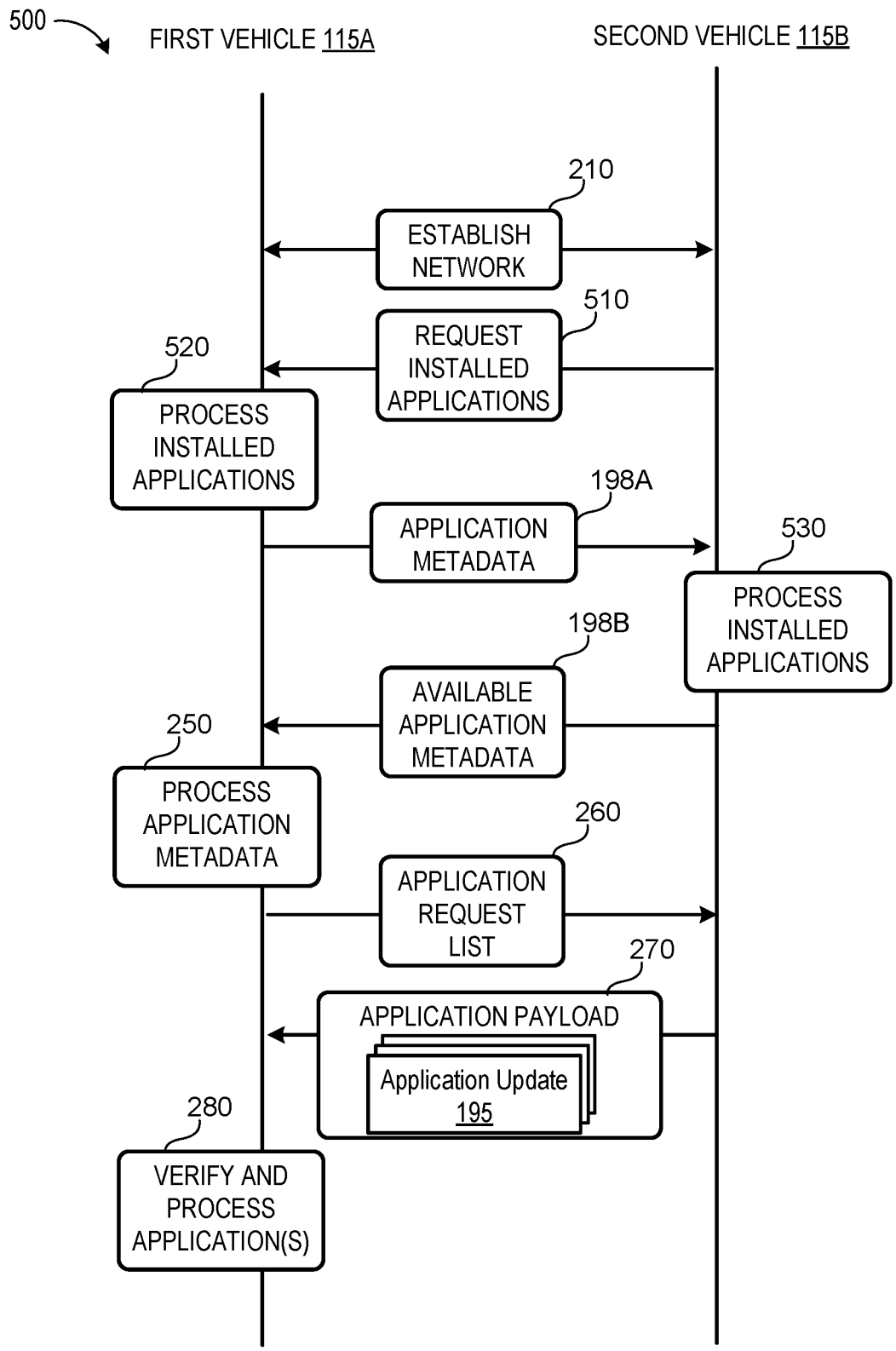
FIG. 5 is a schematic flow diagram that illustrates another embodiment of a transfer of one or more application updates between vehicles, according to some embodiments of the present disclosure.

In some embodiments, the application update process may be further refined to include preprocessing by the second vehicle 115B. For example, the second vehicle 115B may analyze the installed software of the first vehicle 115A to determine which potential application update 195 to present to the first vehicle 115A. FIG. 5 is a schematic flow diagram that illustrates another embodiment of a transfer 500 of one or more application updates 195 between vehicles 115, according to some embodiments of the present disclosure. A description of elements of FIG. 5 that have been previously described will be omitted for brevity.

Referring to FIGS. 1, 2, and 5, an operation to transfer 500 application updates 195 between vehicles 115 may begin with establishing 210 a network 145 between the two vehicles 115. Establishing 210 the network 145 between the two vehicles 115 may be performed similarly to the operation 210 discussed with respect to operation 210 of FIG. 2. Accordingly, a duplicate description of the process will be omitted.

Once the network 145 is established, the second vehicle 115B may request 510 application metadata 198A from the first vehicle 115A. In some embodiments, the request 510 may be for application metadata 198A that are associated with any applications 117 that are currently executing on the ECUs 116 of the first vehicle 115A.

In response to the request 510, the first vehicle 115A may process 520 the applications 117 that are installed on the ECUs 116 of the first vehicle 115A. In some embodiments, the first vehicle 115A may generate a set of application metadata 198A that are associated with any and/or all of the applications 117 that are installed on the ECUs 116 of the first vehicle 115A.

The first vehicle 115A may transfer the application metadata 198A to the second vehicle 115B. The application metadata 198A that is transferred may provide a list of the applications 117 that are executing on the first vehicle 115A that may be available for an application update 195.

The second vehicle 115B may process 530 the application metadata 198A from the first vehicle 115A and generate a list of application metadata 198B that may be transferred to the first vehicle 115A. The list of application metadata 198B may include a list of application updates 195 that are installed on the ECUs 116 of the second vehicle 115B for which the second vehicle 115B has application updates 195 and which match the application metadata 198A of the first vehicle 115A. In some embodiments, the second vehicle 115B may generate a set of application metadata 198B for any and/or all application updates 195 that are present on the second vehicle 115B which match the application metadata 198A of the first vehicle 115A. Thus, the application metadata 198B may only refer to application updates 195 that correspond to applications 117 already present on the ECUs 116 of the first vehicle 115A.

In response to the application metadata 198B, the first vehicle 115A may process 250 the application metadata 198B, generate an application request list 260 and, responsive thereto, verify and process 280 the application payload 270 returned by the second vehicle 115B. The operations of processing 250 the application metadata 198B from the second vehicle 115B to generate the application request list 260 may be similar to the processing 250 described herein with respect to FIGS. 2, 3A, 3B, and 4 and, as a result, a duplicate description thereof will be omitted. For example, the first vehicle 115A may process 250 the application metadata 198B to determine if the metadata is compatible, if the version and/or update timestamp is more recent than the existing application 117, and/or if an install timestamp 188 meets an install threshold 197.

As discussed with respect to FIG. 2, the communication between the first vehicle 115A and the second vehicle 115B described in FIG. 4 may occur primarily or solely over the wireless network 145 between the two vehicles 115. Since both vehicles 115 may be moving during the transfer, it may be possible that a distance between the vehicles 115 becomes too great to sustain the network 145 between the vehicles 115. As a result, the communications illustrated in FIG. 4 over the network 145 may be best effort, and the protocol may be implemented to tolerate failures.

The method 500 of FIG. 5 may further reduce a list of potential application updates 195 that may be provided to the first vehicle 115A for processing, which may increase a speed of the transfer and reduce an amount of resources necessary to perform the update transfer. In some embodiments, the second vehicle 115B may perform further filtering of the application metadata 198B before sending the application metadata 198B to the first vehicle 115A. For example, in some embodiments, the second vehicle 115B may perform additional compatibility checks, and may avoid including in the application metadata 198B any information related to application updates 195 which are known by the second vehicle 115B to be incompatible with the first vehicle 115A.

Figure 6A:
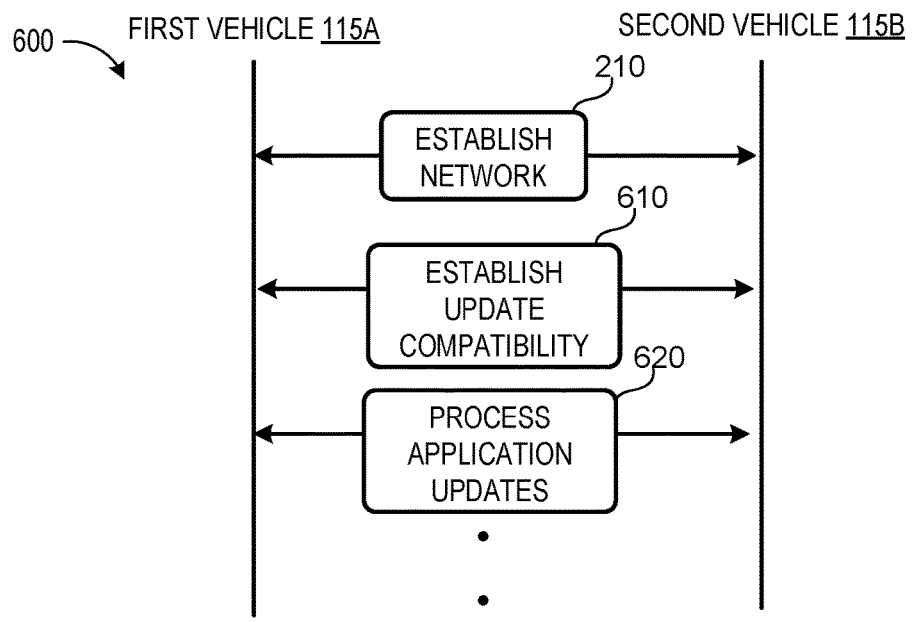
FIG. 6A is a schematic flow diagram that illustrates another embodiment of a transfer of one or more application updates between vehicles, according to some embodiments of the present disclosure.

In some embodiments, additional security may be incorporated into the application update process between the two vehicles 115. For example, prior to performing any updates, it first may be established whether the two vehicles 115 have compatible ECUs 116. FIG. 6A is a schematic flow diagram that illustrates another embodiment of a transfer 600 of one or more application updates 195 between vehicles 115, according to some embodiments of the present disclosure. A description of elements of FIG. 6A that have been previously described will be omitted for brevity.

Referring to FIGS. 1, 2, and 6A, an operation to transfer application updates 195 between vehicles 115 may begin with establishing 210 a network 145 between the two vehicles 115. Establishing 210 the network 145 between the two vehicles 115 may be performed similarly to the operation 210 discussed with respect to operation 210 of FIG. 2. Accordingly, a duplicate description of the process will be omitted.

Once the network 145 is established, and prior to providing any application metadata 198 between the vehicles 115, it may first be determined if the ECUs 116 of the two vehicles 115 are compatible. In some embodiments, establishing ECU compatibility may be a threshold operation. As an example, if the two vehicles 115 are from different manufacturers, it may be unnecessary to proceed further, since the application updates 195 for the ECUs 116 may be incompatible with one another without requiring additional processing.

Therefore, in operation 610, the first vehicle 115A and the second vehicle 115B may establish 610 update compatibility. In some embodiments, establishing 610 update compatibility may include a comparison of vehicle identifiers 182. As illustrated in FIG. 1, the vehicles 115 may include vehicle data 114 that may include, among other data, a vehicle identifier 182. In some embodiments, the vehicle identifier 182 may uniquely identify the vehicle 115 and/or identify a manufacturer of the vehicle 115. In some embodiments, the first vehicle 115A and the second vehicle 115B may exchange vehicle identifiers 182, and may determine update compatibility based thereon.

For example, the first vehicle 115A may include a reference table or other data structure that identifies vehicle identifiers 182 with which the first vehicle 115A is compatible. Based on the vehicle identifier 182 of the second vehicle 115B, the first vehicle 115A may determine if the application updates 195 of the second vehicle 115B would be compatible with the first vehicle 115A. In some embodiments, responsive to determining that the second vehicle 115B is not compatible with the first vehicle 115A, the first vehicle 115A may terminate operations related to transferring application updates 195 from the second vehicle 115B. In some embodiments, responsive to determining that the second vehicle 115B is compatible with the first vehicle 115A, the first vehicle 115A may continue the process 620 of obtaining application updates 195 from the second vehicle 115B, as described herein with respect to FIGS. 2 to 5.

Figure 6B:
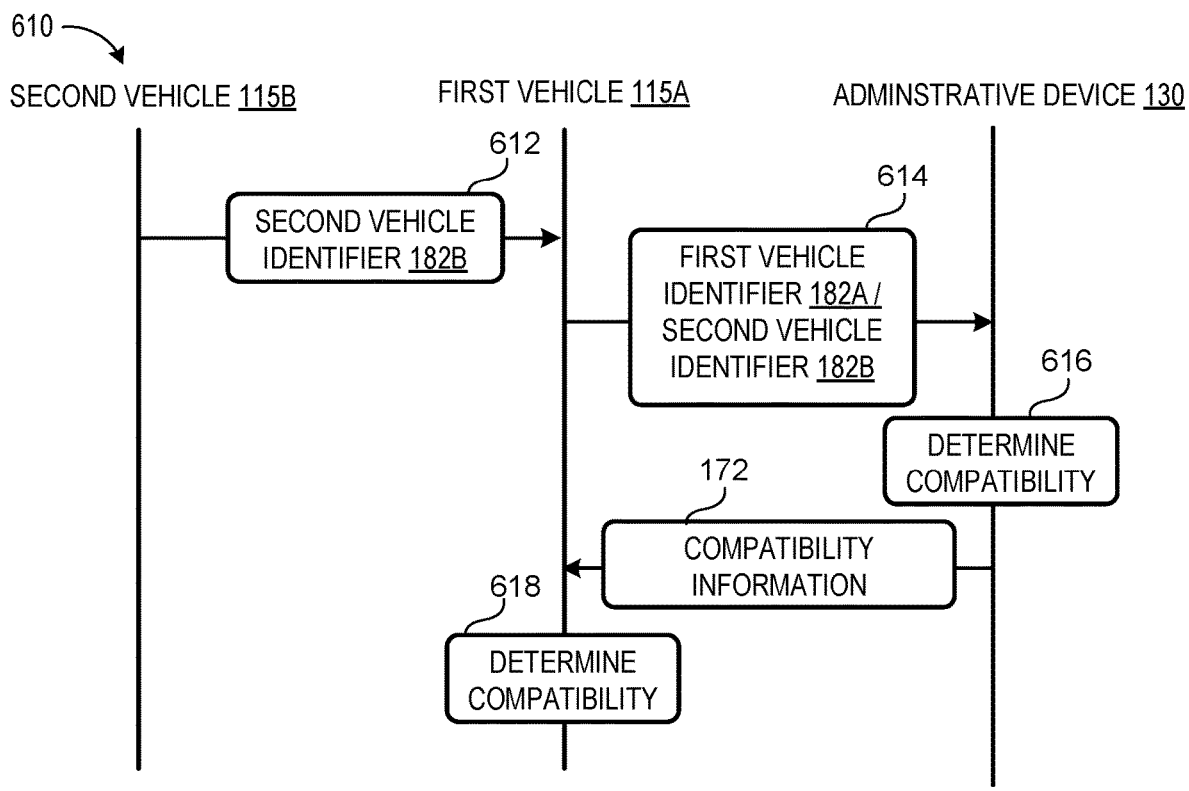
FIG. 6B is a schematic flow diagram that illustrates an example method of establishing update compatibility of the process flow illustrated in FIG. 6A.

In some embodiments, it may be useful to offload the determination of the update compatibility. FIG. 6B is a schematic flow diagram that illustrates an example method 610 of establishing update compatibility of the process flow illustrated in FIG. 6A. A description of elements of FIG. 6A that have been previously described will be omitted for brevity.

As illustrated in FIG. 6B, the operation 610 may begin with the second vehicle 115B providing a second vehicle identifier 182B. As described herein, the second vehicle identifier 182B may identify, and in some embodiments, uniquely identify, the second vehicle 115B. For example, the second vehicle identifier 182B may be a registration number of the second vehicle 115B, or other unique identifier. In some embodiments, the second vehicle identifier 182B may be a plurality of identifiers. For example, the second vehicle identifier 182B may include an identifier for the make of the second vehicle 115B, an identifier for the model of the second vehicle 115B, and/or other identifiers that may be utilized to determine ECU compatibility.

The first vehicle 115A may receive the second vehicle identifier 182B from the second vehicle 115. The first vehicle 115A may combine the second vehicle identifier 182B with a first vehicle identifier 182A from the first vehicle 115A. As with the second vehicle identifier 182B, the first vehicle identifier 182A may identify, and in some embodiments, uniquely identify, the first vehicle 115A. The first vehicle 115A may transmit the first vehicle identifier 182A and the second vehicle identifier 182B to the administrative device 130.

Referring briefly back to FIG. 1, the first vehicle 115A may be coupled to the administrative device 130 via the network 140A. In some embodiments, the administrative device 130 may be represented by a serverless function executing on a computing device having a memory 124 and processing device 122. In some embodiments, the administrative device 130 may execute on a computing device associated with the manufacturer of the first vehicle 115A, but the embodiments of the present disclosure are not limited to such a configuration. In some embodiments, the administrative device 130 may be a third-party computing device that is configured to generate compatibility between different vehicles 115.

The administrative device 130 may be configured to compute information associated with the first and second vehicle identifiers 182 to determine information about the first and second vehicles 115A, 115B. For example, the administrative device 130 may be able to determine a brand and model of the vehicles 115 based on the vehicle identifiers 182. Based on this information, the administrative device 130 may be able to determine compatibility 616 between the ECUs 116 of the first and second vehicles 115. For example, the administrative device 130 may be able to determine if an application update 195 for an ECU 116 of the second vehicle 115B is compatible with (e.g., can be installed upon) an ECU 116 of the first vehicle 115A.

If, in operation 616, it is determined that the first and second vehicles 115A, 115B are compatible, the administrative device may return compatibility information 172 to the first vehicle 115A that indicates the application updates 195 from the second vehicle 115B are compatible with the first vehicle 115A. If, in operation 616, it is determined that the first and second vehicles 115A, 115B are not compatible, the administrative device may return compatibility information 172 to the first vehicle 115A that indicates the application updates 195 from the second vehicle 115B would be incompatible with the first vehicle 115A.

In response to the compatibility information 172 from the administrative device 130, the first vehicle 115A may determine compatibility 618 of the application updates 195 from the second vehicle 115B. If the application updates 195 of the second vehicle 115B would be incompatible with the first vehicle 115A, the first vehicle 115A may terminate update operations with the second vehicle 115B. If the application updates 195 of the second vehicle 115B would be compatible with the first vehicle 115A, the first vehicle 115A may continuate with the update operations with the second vehicle 115B, as described herein with respect to FIGS. 2 to 5.

The use of the administrative device 130 may reduce the computational resources utilized by the first vehicle 115A and/or the second vehicle 115B to determine compatibility and may instead transfer them to a network device (e.g., administrative device 130) that may have more processing resources. In addition, because the network transfer is relatively small (vehicle identifiers 182 and a compatibility information 172), the amount of data transferred is relatively low and, therefore, fast enough to not appreciably impact the update process. In addition, the use of the administrative device 130 may improve the privacy associated with OTA updates, since what may travel through initial data transfers may be public information, such as vehicle identifiers 182 and not, for example, specific information about the equipment and/or current application status of the vehicle 115. Also, the use of the administrative device 130 to determine compatibility allows for the relationships between different vehicles 115, which may be complex, to be maintained as a centralized location. As a result, the information may be up-to-date, and compatibility information can be changed as necessary. The process of establishing 610 update compatibility illustrated in FIG. 6B therefore provides an improvement to the networked update process between vehicles 115 that reduces an amount of data to be transferred while increasing a security of the update process.

Figure 7A:
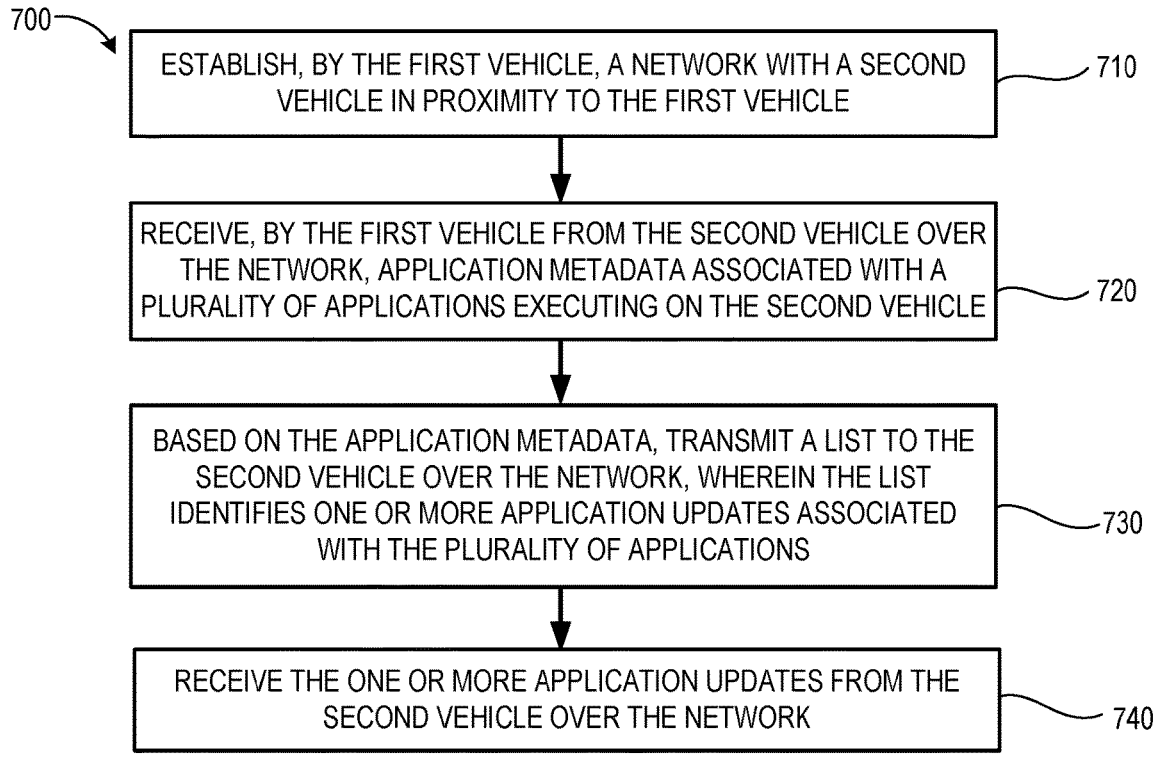
FIG. 7A is a flow diagram of a method of managing applications of a first vehicle, in accordance with some embodiments of the present disclosure.

FIG. 7A is a flow diagram of a method 700 of managing applications of a first vehicle, in accordance with some embodiments of the present disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by a computing device (e.g., ECU controller 110).

With reference to FIG. 7A, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Referring to FIG. 7A as well as the prior figures, method 700 may include block 710, in which a network is established by the first vehicle with a second vehicle in proximity to the first vehicle. In some embodiments, the first vehicle and the second vehicle may be similar to the first vehicle 115A and the second vehicle 115B described herein. In some embodiments, the network may be similar to the network 145 described herein.

At block 720, application metadata is received by the first vehicle from the second vehicle over the network. The application metadata is associated with a plurality of applications executing on the second vehicle. In some embodiments, the application metadata may be similar to the application metadata 198 described herein. In some embodiments, the plurality of application may be similar to the applications 117 described herein.

In some embodiments, the method 700 further includes, prior to receiving, by the first vehicle from the second vehicle over the network, the application metadata associated with the plurality of applications executing on the second vehicle, requesting, by the first vehicle, the application metadata from the second vehicle.

At block 730, based on the application metadata, a list may be transmitted to the second vehicle over the network. The list may identify one or more application updates associated with the plurality of applications. In some embodiments, the list may be similar to the application request list 260 described herein. In some embodiments, the one or more application updates may be similar to the application updates 195 described herein.

In some embodiments, the method 700 further includes, responsive to receiving the application metadata associated with the plurality of applications executing on the second vehicle, processing the application metadata to generate the list of the one or more application updates associated with the plurality of applications executing on the second vehicle.

In some embodiments, processing the application metadata to generate the list of the one or more application updates associated with the plurality of applications executing on the second vehicle comprises comparing a version ID included in the application metadata with a version ID of respective ones of a plurality of applications executing on the first vehicle.

In some embodiments, processing the application metadata to generate the list of the one or more application updates associated with the plurality of applications executing on the second vehicle comprises detecting a compatibility of computing devices of the first vehicle with computing devices of the second vehicle. In some embodiments, detecting the compatibility of the computing devices of the first vehicle with the computing devices of the second vehicle comprises comparing a device ID included in the application metadata with a device ID of respective ones of the computing devices of the first vehicle.

In some embodiments, the plurality of applications executing on the second vehicle are a second plurality of applications, and the one or more application updates correspond to one or more of a first plurality of applications executing on computing devices of the first vehicle, In some embodiments, the application metadata is second application metadata and the method 700 further includes, prior to receiving the second application metadata associated with the second plurality of applications executing on the second vehicle, transmitting, by the first vehicle to the second vehicle, first application metadata associated with the first plurality of applications executing on the computing devices of the first vehicle. In some embodiments, the first application metadata and the second application metadata may be similar to application metadata 198A, 198B described herein, at least, with respect to FIG. 5.

At block 740, the one or more application updates may be received from the second vehicle over the network. In some embodiments, the one or more application updates 195 may be incorporated into an application payload 270, as described herein. In some embodiments, the method 700 further includes, responsive to receiving the one or more application updates from the second vehicle over the network, installing the one or more application updates on one or more electronic control units (ECUs) of the first vehicle. In some embodiments, the installing of the one or more application updates on the one or more ECUs of the first vehicle is delayed until the first vehicle is stationary.

Figure 7B:
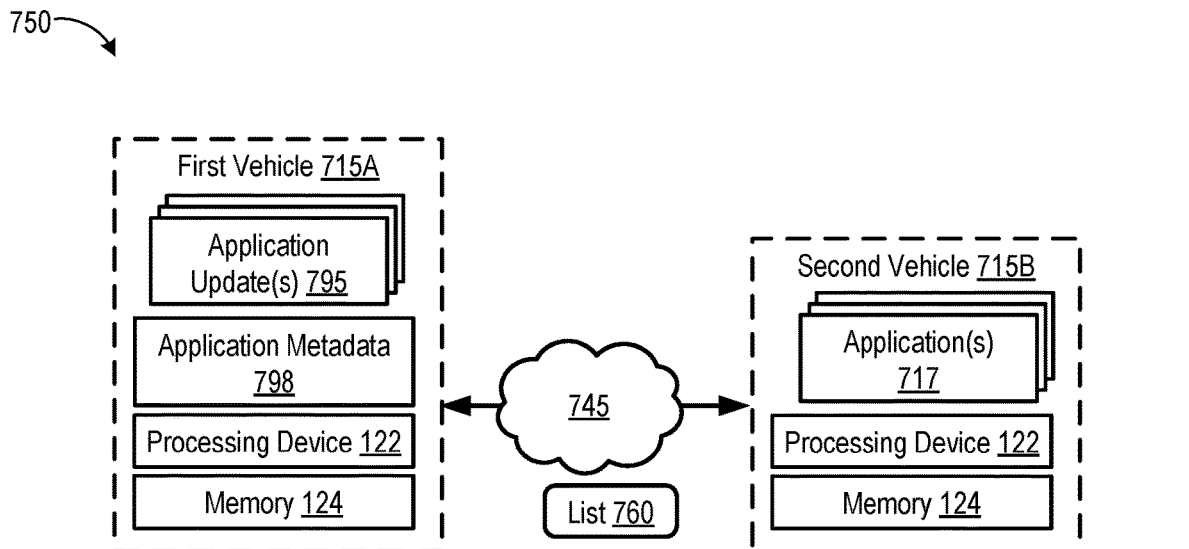
FIG. 7B is a component diagram of an example of a device architecture, according to some embodiments of the disclosure.

FIG. 7B is a component diagram of an example of a device architecture 750, according to some embodiments of the disclosure. The device architecture 750 includes a first vehicle 715A and a second vehicle 715B, each having a processing device 122 and memory 124, as described herein with respect to FIGS. 1 to 7A. In some embodiments, the first vehicle 715A and the second vehicle 715B may be similar to the first vehicle 115A and the second vehicle 115B described herein with respect to FIGS. 1 to 7A.

The first vehicle 715A may be configured to establish a network 745 with the second vehicle 715B that is in proximity to the first vehicle 715A. In some embodiments, the network 745 may be similar to the network 145 described herein with respect to FIGS. 1 to 7A. For example, the network 745 may be a wireless network that is part of a VANET.

In some embodiments, the processing device 122 of the first vehicle 715A may receive application metadata 798 from the second vehicle 715B over the network 745. In some embodiments, the application metadata 798 may be similar to the application metadata 198 described herein with respect to FIGS. 1 to 7A. The application metadata 798 may be associated with a plurality of applications 717 executing on the second vehicle 715B. In some embodiments, the applications 717 may be similar to the applications 117 described herein with respect to FIGS. 1 to 7A.

In some embodiments, based on the application metadata 798, the first vehicle 715A may transmit a list 760 to the second vehicle 715B over the network 745. In some embodiments, the list 760 may be similar to the application request list 260 described herein with respect to FIGS. 1 to 7A. The list 760 may identify one or more application updates 795 associated with the plurality of applications 717. In some embodiments, the application updates 795 may be similar to the application updates 195 described herein with respect to FIGS. 1 to 7A.

In some embodiments, the first vehicle 715A may receive the one or more application updates 795 from the second vehicle 715B over the network 745. In some embodiments, responsive to receiving the one or more application updates 795 from the second vehicle 715B over the network 745, the first vehicle 715A may install the one or more application updates 795 on the first vehicle 715A.

The device architecture 750 of FIG. 7B provides a technological capability to improve the functionality of computing devices of the first vehicle 715A. For example, the device architecture 750 may allow for intra-vehicle application updates that may reduce a reliance on centralized networking that may be unavailable. By propagating application updates 795 between vehicles 715A, 715B, the application updates 795 may be provided more quickly and may contribute to a more stable platform for the first vehicle 715A. The device architecture 750 may allow for the application updates 795 to be acquired even in the absence of a centralized network connection, such as in areas where wireless network access is restricted and/or unavailable. The device architecture 750 may improve the functionality of the first vehicle 715A (and computing devices of the first vehicle 715A) by allowing updated and/or improved computer instructions to be loaded onto the first vehicle 715A to correct application errors or improve functionality.

Figure 8A:
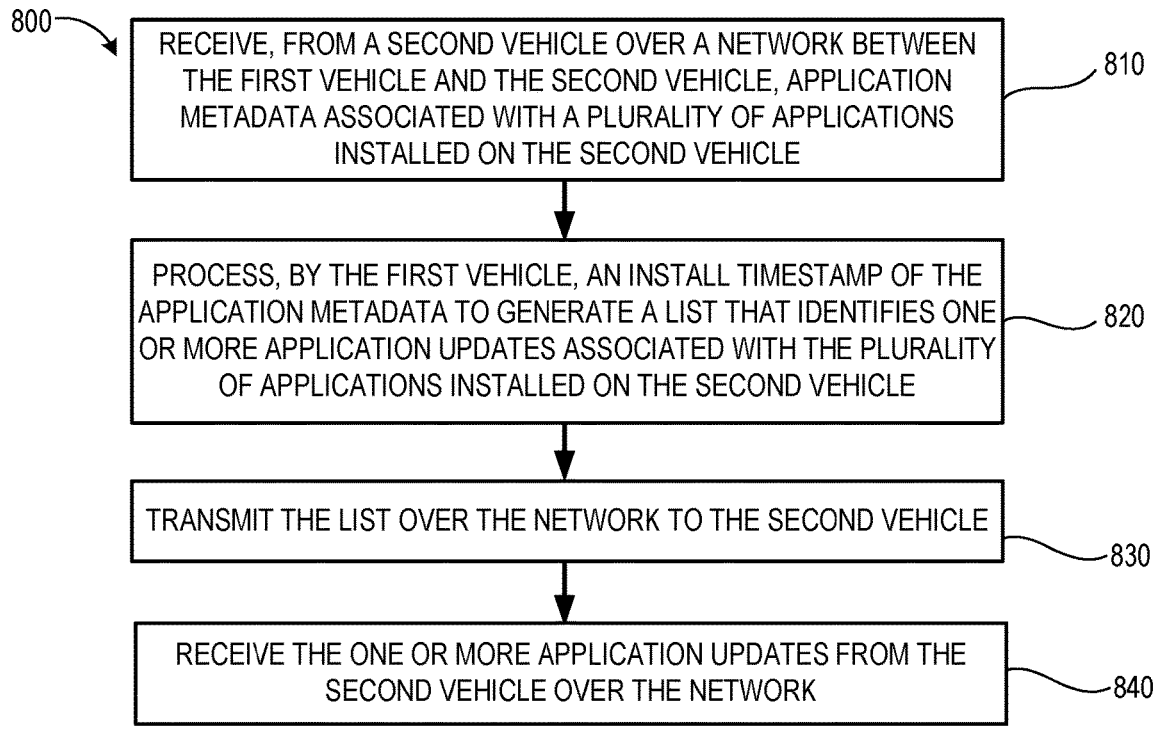
FIG. 8A is a flow diagram of a method of managing applications of a first vehicle, in accordance with some embodiments of the present disclosure.

FIG. 8A is a flow diagram of a method 800 of managing applications of a first vehicle, in accordance with some embodiments of the present disclosure. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 800 may be performed by a computing device (e.g., ECU controller 110).

With reference to FIG. 8A, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Referring to FIG. 8A as well as the prior figures, method 800 may include block 810, in which, application metadata is received from a second vehicle over a network between the first vehicle and the second vehicle. In some embodiments, the first vehicle and the second vehicle may be similar to the first vehicle 115A and the second vehicle 115B described herein. In some embodiments, the network may be similar to the network 145 described herein. In some embodiments, the application metadata may be similar to application metadata 198 described herein. The application metadata may be associated with a plurality of applications installed on the second vehicle. In some embodiments, the plurality of applications may be similar to the applications 117 described herein.

At block 820, an install timestamp of the application metadata is processed by the first vehicle to generate a list that identifies one or more application updates associated with the plurality of applications installed on the second vehicle. In some embodiments, the install timestamp may be similar to the install timestamp 188 described herein. In some embodiments, the list may be similar to the application request list 260 described herein. In some embodiments, the one or more application updates may be similar to the application updates 195 described herein.

In some embodiments, processing the install timestamp of the application metadata to generate the list that identifies the one or more application updates associated with the plurality of applications installed on the second vehicle comprises comparing the install timestamp to an install threshold. In some embodiments, the install threshold is similar to the install threshold 197 described herein. In some embodiments, the method 800 further includes altering the install threshold based on at least one of vehicle data of the first vehicle, environmental data of the first vehicle, or an update communication received by the first vehicle. In some embodiments, the vehicle data, the environmental data, and the update communication may be similar to the vehicle data 114, the environmental data 186, and the update communication 184 described herein.

In some embodiments, the install threshold is altered based on the environmental data of the first vehicle, and the environmental data comprises a route of the first vehicle. In some embodiments, the install threshold is altered based on the update communication received by the first vehicle, and the update communication comprises information related to an error associated with at least one of the one or more application updates. In some embodiments, the install threshold is altered based on the vehicle data of the first vehicle, and the vehicle data comprises information related to a type of the first vehicle.

In some embodiments, the list that identifies one or more application updates associated with the plurality of applications installed on the second vehicle is generated by the first vehicle based on a compatibility of computing devices of the first vehicle with computing devices of the second vehicle.

At block 830, the list is transmitted over the network to the second vehicle.

At block 840, the one or more application updates may be received from the second vehicle over the network. In some embodiments, the one or more application updates may be incorporated into an application payload, such as application payload 270, as described herein. In some embodiments, the method 800 further includes, responsive to receiving the one or more application updates from the second vehicle over the network, installing the one or more application updates on one or more electronic control units (ECUs) of the first vehicle.

In some embodiments, the method 800 further includes, prior to receiving, by the first vehicle from the second vehicle over the network between the first vehicle and the second vehicle, the application metadata associated with the plurality of applications installed on the second vehicle, requesting, by the first vehicle, the application metadata from the second vehicle.

In some embodiments, the application metadata is second application metadata and the plurality of applications installed on the second vehicle are a second plurality of applications, and the method 800 further includes, prior to receiving, by the first vehicle from the second vehicle over the network between the first vehicle and the second vehicle, the second application metadata associated with the second plurality of applications installed on the second vehicle, transmitting, by the first vehicle to the second vehicle, first application metadata associated with a first plurality of applications installed on the first vehicle.

Figure 8B:
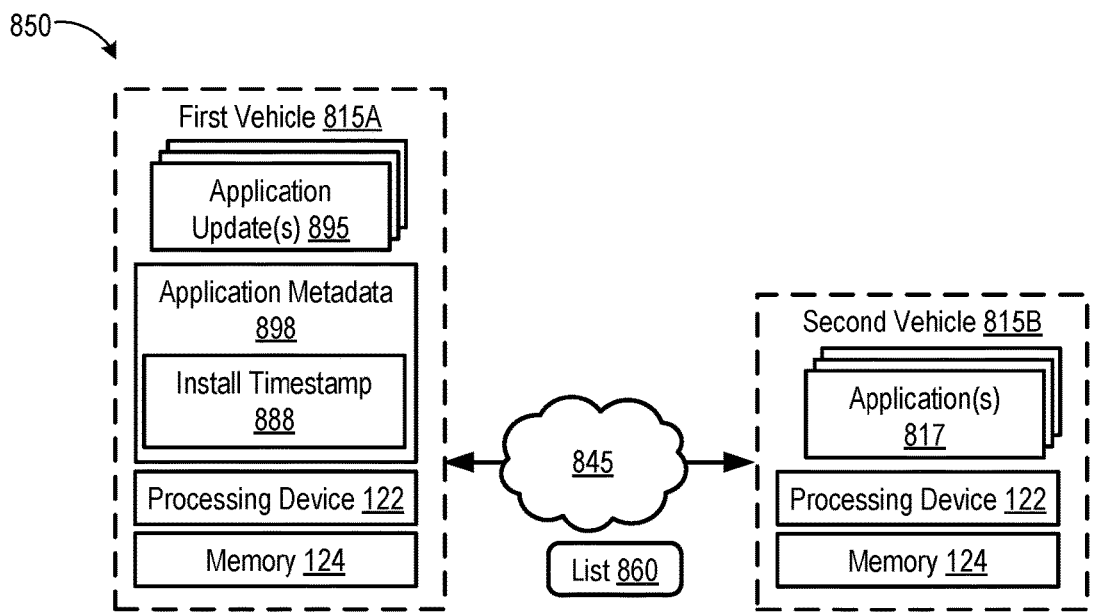
FIG. 8B is a component diagram of an example of a device architecture, according to some embodiments of the disclosure.

FIG. 8B is a component diagram of an example of a device architecture 850, according to some embodiments of the disclosure. The device architecture 850 includes a first vehicle 815A and a second vehicle 815B, each having a processing device 122 and memory 124, as described herein with respect to FIGS. 1 to 8A. In some embodiments, the first vehicle 815A and the second vehicle 815B may be similar to the first vehicle 115A and the second vehicle 115B described herein with respect to FIGS. 1 to 8A.

The first vehicle 815A may be configured to receive from a second vehicle 815B over a network 845 between the first vehicle 815A and the second vehicle 815B, application metadata 898 associated with a plurality of applications 817 executing on the second vehicle 815B. In some embodiments, the application metadata 898 may be similar to the application metadata 198 described herein with respect to FIGS. 1 to 8A. In some embodiments, the network 845 may be similar to the network 145 described herein with respect to FIGS. 1 to 8A. For example, the network 845 may be a wireless network that is part of a VANET.

In some embodiments, the processing device 122 of the first vehicle 815A may process an install timestamp 888 of the application metadata 898 to generate a list 860 that identifies one or more application updates 895 associated with the plurality of applications 817 executing on the second vehicle 815B. In some embodiments, install timestamp 888 may be similar to the install timestamp 188 described herein with respect to FIGS. 1 to 8A. In some embodiments, the list 860 may be similar to the application request list 260 described herein with respect to FIGS. 1 to 8A. In some embodiments, the application updates 895 may be similar to the application updates 195 described herein with respect to FIGS. 1 to 8A.

In some embodiments, the first vehicle 815A may transmit the list 860 over the network 845 to the second vehicle 815B, and receive the one or more application updates 895 from the second vehicle 815B over the network 845. In some embodiments, responsive to receiving the one or more application updates 895 from the second vehicle 815B over the network 845, the first vehicle 815A may install the one or more application updates 895 on the first vehicle 815A.

The device architecture 850 of FIG. 8B provides a technological capability to improve the functionality of computing devices of the first vehicle 815A. For example, the device architecture 850 may allow for intra-vehicle application updates that may reduce a reliance on centralized networking that may be unavailable while protecting a stability of the applications of the first vehicle 815A. By processing the install timestamp 888 from the application metadata 898 received from the second vehicle 815B, the first vehicle 815A may be able to limit installation of any associated application updates 895 to those that have executed for a sufficient amount of time on the second vehicle 815B to provide confidence in the stability of the application update 895 (and its associated application 817). The device architecture 850 may improve the functionality of the first vehicle 815A (and computing devices of the first vehicle 815A) by allowing updated and/or improved computer instructions to be loaded onto the first vehicle 815A to correct application errors or improve functionality while selectively processing the associated application updates 895 to reduce and/or minimize potential errors from application updates 895 that have not had sufficient execution time on the second vehicle 815B.

Figure 9A:
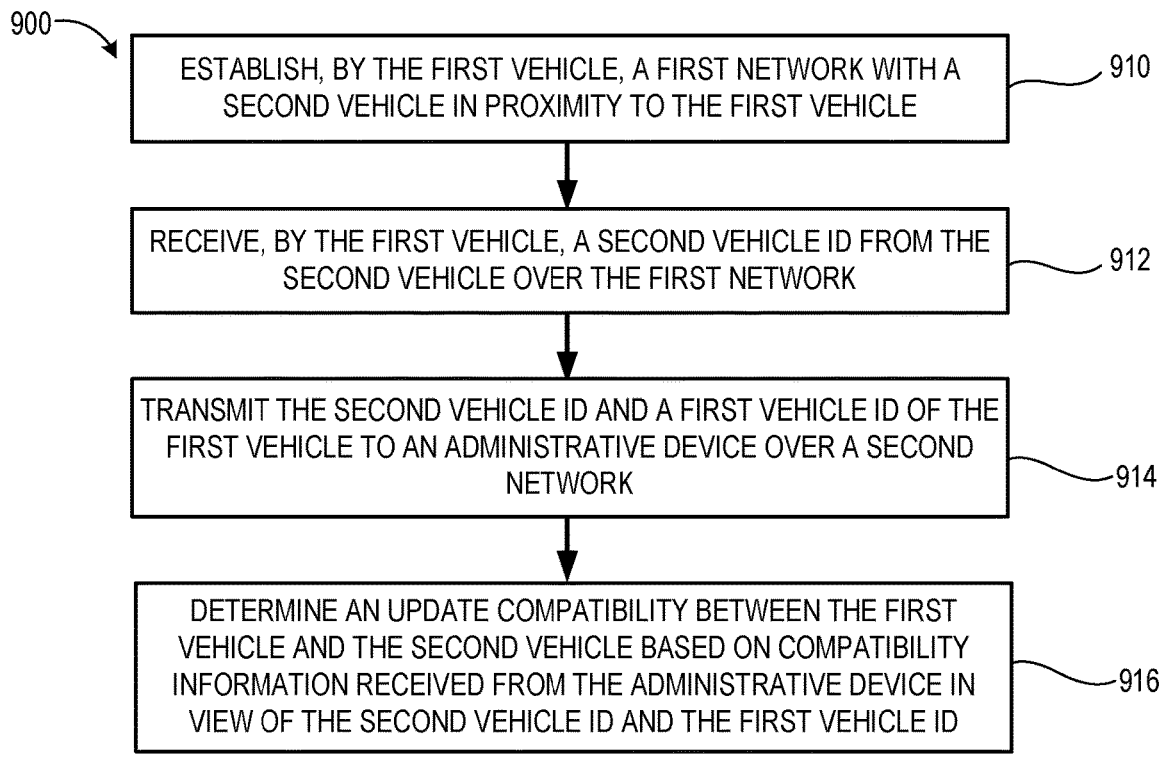
FIG. 9A is a flow diagram of a method of managing applications of a first vehicle, in accordance with some embodiments of the present disclosure.

FIG. 9A is a flow diagram of a method 900 of managing applications of a first vehicle, in accordance with some embodiments of the present disclosure. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 900 may be performed by a computing device (e.g., ECU controller 110).

With reference to FIG. 9A, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

Referring to FIG. 9A as well as the prior figures, method 900 may include block 910, in which a first network is established by the first vehicle with a second vehicle in proximity to the first vehicle. In some embodiments, the first vehicle and the second vehicle may be similar to the first vehicle 115A and the second vehicle 115B described herein. In some embodiments, the first network may be similar to the network 145 described herein. In some embodiments, the first network is a vehicle-to-vehicle (V2V) network.

At block 912, a second vehicle ID is received by the first vehicle from the second vehicle over the first network. In some embodiments, the second vehicle ID may be similar to the second vehicle ID 182B described herein.

At block 914, the second vehicle ID and a first vehicle ID of the first vehicle are transmitted to an administrative device over a second network. In some embodiments, the administrative device may be similar to the administrative device 130 described herein. In some embodiments, the second network may be similar to the network 140A described herein. In some embodiments, the first vehicle ID may be similar to the first vehicle ID 182A described herein. In some embodiments, the first vehicle ID comprises a registration number that uniquely identifies the first vehicle.

At block 916, an update compatibility is determined between the first vehicle and the second vehicle based on compatibility information received from the administrative device in view of the second vehicle ID and the first vehicle ID. In some embodiments, the compatibility information may be similar to the compatibility information 172 described herein. In some embodiments, the update compatibility indicates a compatibility between a first electronic control unit (ECU) of the first vehicle with a second ECU of the second vehicle. In some embodiments, the ECU of the first vehicle and/or the second vehicle may be similar to the ECU 116 described herein.

In some embodiments, the method 900 further includes, responsive to determining that the first vehicle does not have the update compatibility with the second vehicle, terminating the first network between the first vehicle and the second vehicle.

In some embodiments, the method 900 may further include responsive to determining that the first vehicle has the update compatibility with the second vehicle, processing an application update received from the second vehicle. In some embodiments, the application update may be similar to the application update 195 described herein.

In some embodiments, processing the application update received from the second vehicle includes: receiving, by the processing device of the first vehicle from the second vehicle over the first network, application metadata associated with a plurality of applications executing on the second vehicle; based on the application metadata, transmitting a list over the first network that identifies the application update associated with one or more applications of the plurality of applications to the second vehicle; and receiving the application update from the second vehicle over the first network. In some embodiments, the application metadata may be similar to application metadata 198 described herein. In some embodiments, the plurality of applications may be similar to the applications 117 described herein. In some embodiments, the list may be similar to the application request list 260 described herein. In some embodiments, the method 900 further includes, responsive to receiving the application update from the second vehicle over the first network, installing the application update on one or more electronic control units (ECUs) of the first vehicle. In some embodiments, the ECUs may be similar to the ECUs 116 described herein. In some embodiments, the method 900 further includes, responsive to receiving the application metadata associated with the plurality of applications executing on the second vehicle, processing the application metadata to generate the list that identifies the application update associated with one or more applications of the plurality of applications executing on the second vehicle.

In some embodiments, the application metadata is second application metadata, and the method 900 further includes, prior to receiving the second application metadata associated with the plurality of applications executing on the second vehicle, transmitting, by the first vehicle to the second vehicle over the first network, first application metadata associated with the plurality of applications executing on the first vehicle.

Figure 9B:
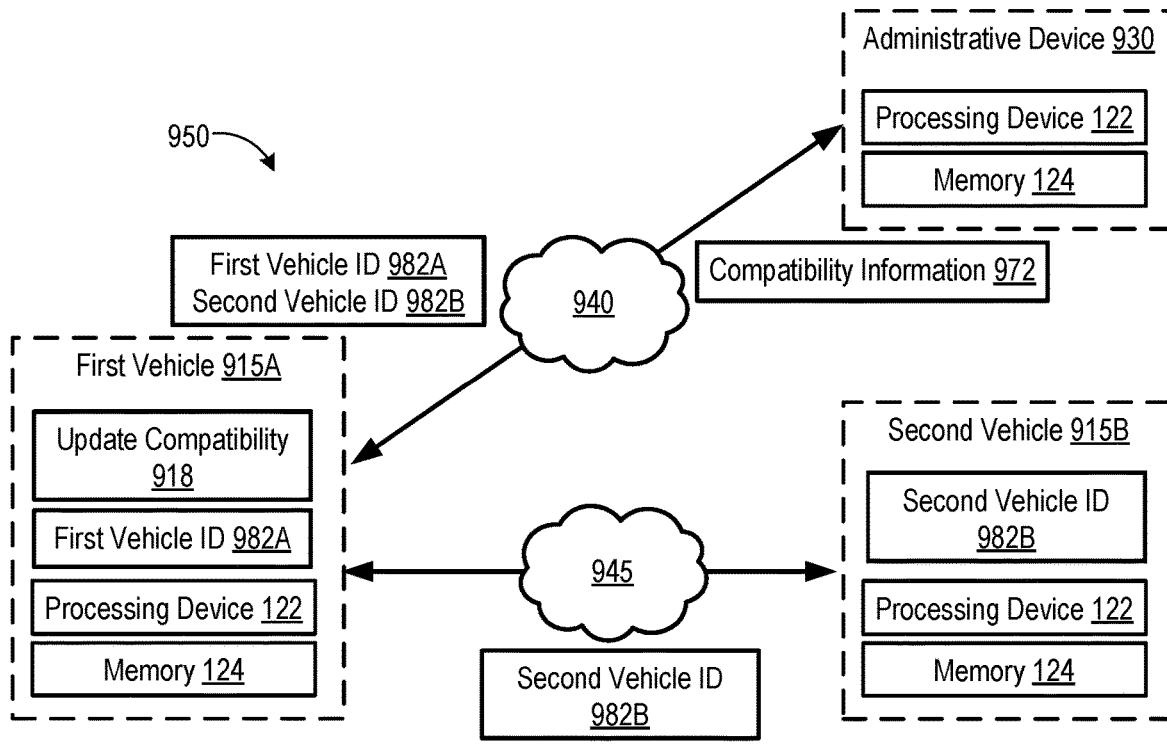
FIG. 9B is a component diagram of an example of a device architecture, according to some embodiments of the disclosure.

FIG. 9B is a component diagram of an example of a device architecture 950, according to some embodiments of the disclosure. The device architecture 950 includes a first vehicle 915A, a second vehicle 915B, and an administrative device 930, each having a processing device 122 and memory 124, as described herein with respect to FIGS. 1 to 9A. In some embodiments, the first vehicle 915A and the second vehicle 915B may be similar to the first vehicle 115A and the second vehicle 115B described herein with respect to FIGS. 1 to 9A. In some embodiments, the administrative device 930 may be similar to the administrative device 130 described herein with respect to FIGS. 1 to 9A.

The first vehicle 915A may be configured to establish a first network 945 with the second vehicle 915B that is in proximity to the first vehicle 915A. In some embodiments, the first network 945 may be similar to the network 145 described herein with respect to FIGS. 1 to 9A. For example, the first network 945 may be a wireless network that is part of a VANET.

In some embodiments, the processing device 122 of the first vehicle 915A may receive a second vehicle ID 982B from the second vehicle 915B over the network 945. In some embodiments, the second vehicle ID 982B may be similar to the second vehicle ID 182B described herein with respect to FIGS. 1 to 9A.

In some embodiments, the second vehicle ID 982B and a first vehicle ID 982A of the first vehicle 915A are transmitted to the administrative device 930 over a second network 940. In some embodiments, the first vehicle ID 982A may be similar to the first vehicle ID 182A described herein with respect to FIGS. 1 to 9A. In some embodiments, the second network 940 may be similar to the network 140A described herein with respect to FIGS. 1 to 9A.

In some embodiments, an update compatibility 918 may be determined between the first vehicle 915A and the second vehicle 915B based on compatibility information 972 received from the administrative device 930 in view of the second vehicle ID 982B and the first vehicle ID 982A. In some embodiments, the compatibility information 972 may be similar to the compatibility information 172 described herein with respect to FIGS. 1 to 9A.

The device architecture 950 of FIG. 9B provides a technological capability to improve the functionality of computing devices of the first vehicle 915A. For example, the device architecture 950 may allow for intra-vehicle application updates to be limited to those vehicles 915A/915B that have an update compatibility with one another. The use of an administrative device 930 may offload the determination of the update compatibility from the first vehicle 915A, which may reduce an amount of resources utilized by the first vehicle 915A to support the application update, while allowing for the update compatibility to be more easily changed at a centralized, or semi-centralized, administrative device 930. The device architecture 950 may improve the functionality of the first vehicle 915A (and computing devices of the first vehicle 915A) by allowing updated and/or improved computer instructions to be loaded onto the first vehicle 915A to correct application errors or improve functionality while reducing an amount of network operations utilized to provide the updated and/or improved computer instructions.

Figure 10:
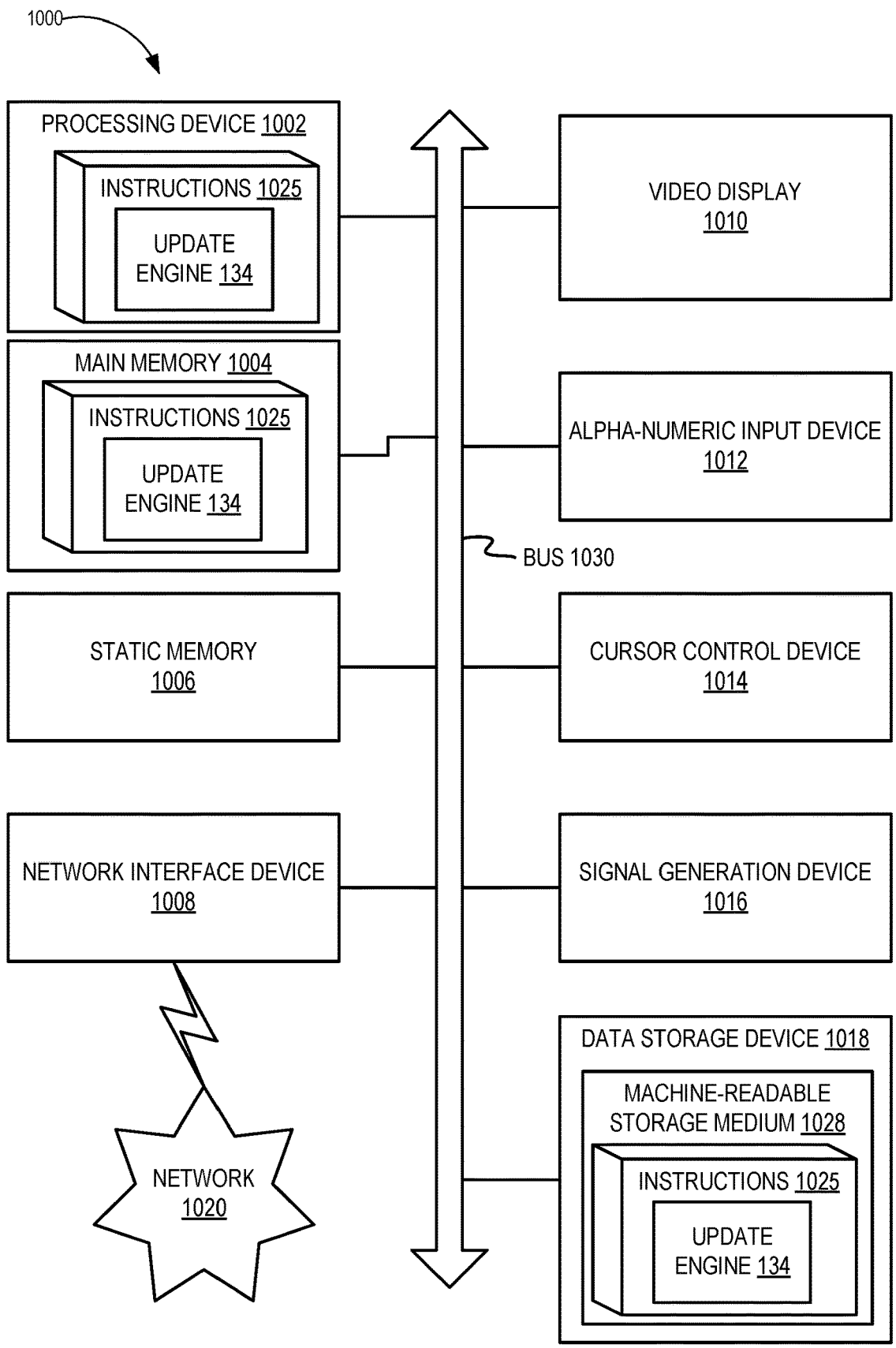
FIG. 10 is a block diagram that illustrates an example system, according to some embodiments of the present disclosure.

FIG. 10 is a block diagram of an example computing device 1000 that may perform one or more of the operations described herein, in accordance with some embodiments of the disclosure. Computing device 1000 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also include one or more special-purpose processing devices such as an application specific integrated circuit (ASIC), a field programmable gate array (FPGA), a digital signal processor (DSP), network processor, or the like. The processing device 1002 may execute the operations described herein, in accordance with one or more aspects of the present disclosure, for performing the operations and steps discussed herein.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions 1025 that may include instructions for a component (e.g., update engine 134 of ECU controller 110 discussed herein) for carrying out the operations described herein, in accordance with one or more aspects of the present disclosure. Instructions 1025 may also reside, completely or at least partially, within main memory 1004 and/or within processing device 1002 during execution thereof by computing device 1000, main memory 1004 and processing device 1002 also constituting computer-readable media. The instructions 1025 may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Example 1 is a method of managing applications of a first vehicle, the method comprising: establishing, by the first vehicle, a network with a second vehicle in proximity to the first vehicle; receiving, by a processing device of the first vehicle from the second vehicle over the network, application metadata associated with a plurality of applications executing on the second vehicle; based on the application metadata, transmitting a list to the second vehicle over the network, wherein the list identifies one or more application updates associated with the plurality of applications; and receiving the one or more application updates from the second vehicle over the network.

Example 2 is the method of Example 1, wherein the plurality of applications executing on the second vehicle are a second plurality of applications, and wherein the one or more application updates correspond to one or more of a first plurality of applications executing on computing devices of the first vehicle.

Example 3 is the method of any of Examples 1-2, wherein the application metadata is second application metadata, and wherein the method further comprises: prior to receiving the second application metadata associated with the second plurality of applications executing on the second vehicle, transmitting, by the first vehicle to the second vehicle, first application metadata associated with the first plurality of applications executing on the computing devices of the first vehicle.

Example 4 is the method of any of Examples 1-3, further comprising responsive to receiving the one or more application updates from the second vehicle over the network, installing the one or more application updates on one or more electronic control units (ECUs) of the first vehicle.

Example 5 is the method of any of Examples 1-4, wherein the installing of the one or more application updates on the one or more ECUs of the first vehicle is delayed until the first vehicle is stationary.

Example 6 is the method of any of Examples 1-5, further comprising prior to receiving, by the first vehicle from the second vehicle over the network, the application metadata associated with the plurality of applications executing on the second vehicle, requesting, by the first vehicle, the application metadata from the second vehicle.

Example 7 is the method of any of Examples 1-6, further comprising responsive to receiving the application metadata associated with the plurality of applications executing on the second vehicle, processing the application metadata to generate the list of the one or more application updates associated with the plurality of applications executing on the second vehicle.

Example 8 is the method of any of Examples 1-7, wherein processing the application metadata to generate the list of the one or more application updates associated with the plurality of applications executing on the second vehicle comprises comparing a version identifier (ID) included in the application metadata with a version ID of respective ones of a plurality of applications executing on the first vehicle.

Example 9 is the method of any of Examples 1-8, wherein processing the application metadata to generate the list of the one or more application updates associated with the plurality of applications executing on the second vehicle comprises detecting a compatibility of computing devices of the first vehicle with computing devices of the second vehicle.

Example 10 is the method of any of Examples 1-9, wherein detecting the compatibility of the computing devices of the first vehicle with the computing devices of the second vehicle comprises comparing a device identifier (ID) included in the application metadata with a device ID of respective ones of the computing devices of the first vehicle.

Example 11 is a system of a first vehicle comprising a memory; and a processing device, operatively coupled to the memory, to: establish, by the first vehicle, a network with a second vehicle in proximity to the first vehicle; receive, by the first vehicle from the second vehicle over the network, application metadata associated with a plurality of applications executing on the second vehicle; based on the application metadata, transmit a list to the second vehicle over the network, wherein the list identifies one or more application updates associated with the plurality of applications; and receive the one or more application updates from the second vehicle over the network Example 12 is the method of Example 11, wherein the plurality of applications executing on the second vehicle are a second plurality of applications, and wherein the one or more application updates correspond to one or more of a first plurality of applications executing on computing devices of the first vehicle.

Example 13 is the method of any of Examples 11-12, wherein the application metadata is second application metadata, and wherein the processing device is further to: prior to receiving the second application metadata associated with the second plurality of applications executing on the second vehicle, transmit, by the first vehicle to the second vehicle, first application metadata associated with the first plurality of applications executing on the computing devices of the first vehicle.

Example 14 is the method of any of Examples 11-13, wherein the processing device is further to: responsive to receiving the one or more application updates from the second vehicle over the network, install the one or more application updates on one or more electronic control units (ECUs) of the first vehicle.

Example 15 is the method of any of Examples 11-14, wherein the installing of the one or more application updates on the one or more ECUs of the first vehicle is delayed until the first vehicle is stationary.

Example 16 is the method of any of Examples 11-15, wherein the processing device is further to: prior to receiving, by the first vehicle from the second vehicle over the network, the application metadata associated with the plurality of applications executing on the second vehicle, request, by the first vehicle, the application metadata from the second vehicle.

Example 17 is the method of any of Examples 11-16, wherein the processing device is further to: responsive to receiving the application metadata associated with the plurality of applications executing on the second vehicle, process the application metadata to generate the list of the one or more application updates associated with the plurality of applications executing on the second vehicle.

Example 18 is the method of any of Examples 11-17, wherein, to process the application metadata to generate the list of the one or more application updates associated with the plurality of applications executing on the second vehicle, the processing device is to compare a version identifier (ID) included in the application metadata with a version ID of respective ones of a plurality of applications executing on the first vehicle.

Example 19 is the method of any of Examples 11-18, wherein, to process the application metadata to generate the list of the one or more application updates associated with the plurality of applications executing on the second vehicle, the processing device is to detect a compatibility of computing devices of the first vehicle with computing devices of the second vehicle.

Example 20 is the method of any of Examples 11-19, wherein, to detect the compatibility of the computing devices of the first vehicle with the computing devices of the second vehicle, the processing device is to compare a device identifier (ID) included in the application metadata with a device ID of respective ones of the computing devices of the first vehicle.

Example 21 is a non-transitory computer-readable storage medium including instructions that, when executed by a processing device of a first vehicle, cause the processing device to: establish, by the first vehicle, a network with a second vehicle in proximity to the first vehicle; receive, by the processing device of the first vehicle from the second vehicle over the network, application metadata associated with a plurality of applications executing on the second vehicle; based on the application metadata, transmit a list to the second vehicle over the network, wherein the list identifies one or more application updates associated with the plurality of applications; and receive the one or more application updates from the second vehicle over the network Example 22 is the non-transitory computer-readable storage medium of Example 21, wherein the plurality of applications executing on the second vehicle are a second plurality of applications, and wherein the one or more application updates correspond to one or more of a first plurality of applications executing on computing devices of the first vehicle.

Example 23 is the non-transitory computer-readable storage medium of any of Examples 21-22, wherein the application metadata is second application metadata, and wherein the processing device is further to: prior to receiving the second application metadata associated with the second plurality of applications executing on the second vehicle, transmit, by the first vehicle to the second vehicle, first application metadata associated with the first plurality of applications executing on the computing devices of the first vehicle.

Example 24 is the non-transitory computer-readable storage medium of any of Examples 21-23, wherein the processing device is further to: responsive to receiving the one or more application updates from the second vehicle over the network, install the one or more application updates on one or more electronic control units (ECUs) of the first vehicle.

Example 25 is the non-transitory computer-readable storage medium of any of Examples 21-24, wherein the installing of the one or more application updates on the one or more ECUs of the first vehicle is delayed until the first vehicle is stationary.

Example 26 is the non-transitory computer-readable storage medium of any of Examples 21-25, wherein the processing device is further to: prior to receiving, by the first vehicle from the second vehicle over the network, the application metadata associated with the plurality of applications executing on the second vehicle, request, by the first vehicle, the application metadata from the second vehicle.

Example 27 is the non-transitory computer-readable storage medium of any of Examples 21-26, wherein the processing device is further to: responsive to receiving the application metadata associated with the plurality of applications executing on the second vehicle, the application metadata to generate the list of the one or more application updates associated with the plurality of applications executing on the second vehicle.

Example 28 is the non-transitory computer-readable storage medium of any of Examples 21-27, wherein, to process the application metadata to generate the list of the one or more application updates associated with the plurality of applications executing on the second vehicle, the processing device is to compare a version identifier (ID) included in the application metadata with a version ID of respective ones of a plurality of applications executing on the first vehicle.

Example 29 is the non-transitory computer-readable storage medium of any of Examples 21-28, wherein, to process the application metadata to generate the list of the one or more application updates associated with the plurality of applications executing on the second vehicle, the processing device is to detect a compatibility of computing devices of the first vehicle with computing devices of the second vehicle.

Example 30 is the non-transitory computer-readable storage medium of any of Examples 21-29, wherein, to detect the compatibility of the computing devices of the first vehicle with the computing devices of the second vehicle, the processing device is to compare a device identifier (ID) included in the application metadata with a device ID of respective ones of the computing devices of the first vehicle.

Example 31 is an apparatus of a first vehicle comprising: means to establish, by the first vehicle, a network with a second vehicle in proximity to the first vehicle; means to receive, by the first vehicle from the second vehicle over the network, application metadata associated with a plurality of applications executing on the second vehicle; means to transmit, based on the application metadata, a list to the second vehicle over the network, wherein the list identifies one or more application updates associated with the plurality of applications; and means to receive the one or more application updates from the second vehicle over the network Example 32 is the apparatus of Example 31, wherein the plurality of applications executing on the second vehicle are a second plurality of applications, and wherein the one or more application updates correspond to one or more of a first plurality of applications executing on computing devices of the first vehicle.

Example 33 is the apparatus of any of Examples 31-32, wherein the application metadata is second application metadata, and wherein the apparatus further comprises means to transmit, prior to receiving the second application metadata associated with the second plurality of applications executing on the second vehicle, by the first vehicle to the second vehicle, first application metadata associated with the first plurality of applications executing on the computing devices of the first vehicle.

Example 34 is the apparatus of any of Examples 31-33, wherein the apparatus further comprises means to install, responsive to receiving the one or more application updates from the second vehicle over the network, the one or more application updates on one or more electronic control units (ECUs) of the first vehicle.

Example 35 is the apparatus of any of Examples 31-34, wherein the installing of the one or more application updates on the one or more ECUs of the first vehicle is delayed until the first vehicle is stationary.

Example 36 is the apparatus of any of Examples 31-35, further comprising, prior to receiving, by the first vehicle from the second vehicle over the network, the application metadata associated with the plurality of applications executing on the second vehicle, means to request, by the first vehicle, the application metadata from the second vehicle.

Example 37 is the apparatus of any of Examples 31-36, further comprising, responsive to receiving the application metadata associated with the plurality of applications executing on the second vehicle, means to process the application metadata to generate the list of the one or more application updates associated with the plurality of applications executing on the second vehicle.

Example 38 is the apparatus of any of Examples 31-37, wherein the means to process the application metadata to generate the list of the one or more application updates associated with the plurality of applications executing on the second vehicle comprises means to compare a version identifier (ID) included in the application metadata with a version ID of respective ones of a plurality of applications executing on the first vehicle.

Example 39 is the apparatus of any of Examples 31-38, wherein the means to process the application metadata to generate the list of the one or more application updates associated with the plurality of applications executing on the second vehicle comprises means to detect a compatibility of computing devices of the first vehicle with computing devices of the second vehicle.

Example 40 is the apparatus of any of Examples 31-39, wherein the means to detect the compatibility of the computing devices of the first vehicle with the computing devices of the second vehicle comprises means to compare a device identifier (ID) included in the application metadata with a device ID of respective ones of the computing devices of the first vehicle.

Example 41 is a method of managing applications of a first vehicle, the method comprising: receiving, from a second vehicle over a network between the first vehicle and the second vehicle, application metadata associated with a plurality of applications installed on the second vehicle; processing, by a processing device of the first vehicle, an install timestamp of the application metadata to generate a list that identifies one or more application updates associated with the plurality of applications installed on the second vehicle; transmitting the list over the network to the second vehicle; and receiving the one or more application updates from the second vehicle over the network.

Example 42 is the method of Example 41, further comprising responsive to receiving the one or more application updates from the second vehicle over the network, installing the one or more application updates on one or more electronic control units (ECUs) of the first vehicle.

Example 43 is the method of any of Examples 41-42, wherein processing the install timestamp of the application metadata to generate the list that identifies the one or more application updates associated with the plurality of applications installed on the second vehicle comprises comparing the install timestamp to an install threshold.

Example 44 is the method of any of Examples 41-43, further comprising altering the install threshold based on at least one of vehicle data of the first vehicle, environmental data of the first vehicle, or an update communication received by the first vehicle.

Example 45 is the method of any of Examples 41-44, wherein the install threshold is altered based on the environmental data of the first vehicle, and wherein the environmental data comprises a route of the first vehicle.

Example 46 is the method of any of Examples 41-45, wherein the install threshold is altered based on the update communication received by the first vehicle, and wherein the update communication comprises information related to an error associated with at least one of the one or more application updates.

Example 47 is the method of any of Examples 41-46, wherein the install threshold is altered based on the vehicle data of the first vehicle, and wherein the vehicle data comprises information related to a type of the first vehicle.

Example 48 is the method of any of Examples 41-47, further comprising: prior to receiving, by the processing device of the first vehicle from the second vehicle over the network between the first vehicle and the second vehicle, the application metadata associated with the plurality of applications installed on the second vehicle, requesting, by the first vehicle, the application metadata from the second vehicle.

Example 49 is the method of any of Examples 41-48, wherein the list that identifies one or more application updates associated with the plurality of applications installed on the second vehicle is generated by the first vehicle based on a compatibility of computing devices of the first vehicle with computing devices of the second vehicle.

Example 50 is the method of any of Examples 41-49, wherein the application metadata is second application metadata and the plurality of applications installed on the second vehicle are a second plurality of applications, and wherein the method further comprises: prior to receiving, by the processing device of the first vehicle from the second vehicle over the network between the first vehicle and the second vehicle, the second application metadata associated with the second plurality of applications installed on the second vehicle, transmitting, by the first vehicle to the second vehicle, first application metadata associated with a first plurality of applications installed on the first vehicle.

Example 51 is a system of a first vehicle comprising: a memory; and a processing device, operatively coupled to the memory, to: receive, from a second vehicle over a network between the first vehicle and the second vehicle, application metadata associated with a plurality of applications installed on the second vehicle; process, by the first vehicle, an install timestamp of the application metadata to generate a list that identifies one or more application updates associated with the plurality of applications installed on the second vehicle; transmit the list over the network to the second vehicle; and receive the one or more application updates from the second vehicle over the network.

Example 52 is the system of Example 51, wherein the processing device is further to: responsive to receiving the one or more application updates from the second vehicle over the network, install the one or more application updates on one or more electronic control units (ECUs) of the first vehicle.

Example 53 is the system of any of Examples 51-52, wherein, to process the install timestamp of the application metadata to generate the list that identifies the one or more application updates associated with the plurality of applications installed on the second vehicle, the processing device is to compare the install timestamp to an install threshold.

Example 54 is the system of any of Examples 51-53, wherein the processing device is further to: alter the install threshold based on at least one of vehicle data of the first vehicle, environmental data of the first vehicle, or an update communication received by the first vehicle.

Example 55 is the system of any of Examples 51-54, wherein the install threshold is altered based on the environmental data of the first vehicle, and wherein the environmental data comprises a route of the first vehicle.

Example 56 is the system of any of Examples 51-55, wherein the install threshold is altered based on the update communication received by the first vehicle, and wherein the update communication comprises information related to an error associated with at least one of the one or more application updates.

Example 57 is the system of any of Examples 51-56, wherein the install threshold is altered based on the vehicle data of the first vehicle, and wherein the vehicle data comprises information related to a type of the first vehicle.

Example 58 is the system of any of Examples 51-57, wherein the processing device is further to: prior to receiving, by the processing device of the first vehicle from the second vehicle over the network between the first vehicle and the second vehicle, the application metadata associated with the plurality of applications installed on the second vehicle, request, by the first vehicle, the application metadata from the second vehicle.

Example 59 is the system of any of Examples 51-58, wherein the list that identifies one or more application updates associated with the plurality of applications installed on the second vehicle is generated by the first vehicle based on a compatibility of computing devices of the first vehicle with computing devices of the second vehicle.

Example 60 is the system of any of Examples 51-59, wherein the application metadata is second application metadata and the plurality of applications installed on the second vehicle are a second plurality of applications, and wherein the processing device is further to: prior to receiving, by the processing device of the first vehicle from the second vehicle over the network between the first vehicle and the second vehicle, the second application metadata associated with the second plurality of applications installed on the second vehicle, transmit, by the first vehicle to the second vehicle, first application metadata associated with a first plurality of applications installed on the first vehicle.

Example 61 is non-transitory computer-readable storage medium including instructions that, when executed by a processing device of a first vehicle, cause the processing device to: receive, from a second vehicle over a network between the first vehicle and the second vehicle, application metadata associated with a plurality of applications installed on the second vehicle; process, by the processing device of the first vehicle, an install timestamp of the application metadata to generate a list that identifies one or more application updates associated with the plurality of applications installed on the second vehicle; transmit the list over the network to the second vehicle; and receive the one or more application updates from the second vehicle over the network.

Example 62 is the non-transitory computer-readable storage medium of Example 61, wherein the processing device is further to: responsive to receiving the one or more application updates from the second vehicle over the network, install the one or more application updates on one or more electronic control units (ECUs) of the first vehicle.

Example 63 is the non-transitory computer-readable storage medium of any of Examples 61-62, wherein, to process the install timestamp of the application metadata to generate the list that identifies the one or more application updates associated with the plurality of applications installed on the second vehicle, the processing device is to compare the install timestamp to an install threshold.

Example 64 is the non-transitory computer-readable storage medium of any of Examples 61-63, wherein the processing device is further to: alter the install threshold based on at least one of vehicle data of the first vehicle, environmental data of the first vehicle, or an update communication received by the first vehicle.

Example 65 is the non-transitory computer-readable storage medium of any of Examples 61-64, wherein the install threshold is altered based on the environmental data of the first vehicle, and wherein the environmental data comprises a route of the first vehicle.

Example 66 is the non-transitory computer-readable storage medium of any of Examples 61-65, wherein the install threshold is altered based on the update communication received by the first vehicle, and wherein the update communication comprises information related to an error associated with at least one of the one or more application updates.

Example 67 is the non-transitory computer-readable storage medium of any of Examples 61-66, wherein the install threshold is altered based on the vehicle data of the first vehicle, and wherein the vehicle data comprises information related to a type of the first vehicle.

Example 68 is the non-transitory computer-readable storage medium of any of Examples 61-67, wherein the processing device is further to: prior to receiving, by the processing device of the first vehicle from the second vehicle over the network between the first vehicle and the second vehicle, the application metadata associated with the plurality of applications installed on the second vehicle, request, by the first vehicle, the application metadata from the second vehicle.

Example 69 is the non-transitory computer-readable storage medium of any of Examples 61-68, wherein the list that identifies one or more application updates associated with the plurality of applications installed on the second vehicle is generated by the first vehicle based on a compatibility of computing devices of the first vehicle with computing devices of the second vehicle.

Example 70 is the non-transitory computer-readable storage medium of any of Examples 61-69, wherein the application metadata is second application metadata and the plurality of applications installed on the second vehicle are a second plurality of applications, and wherein the processing device is further to: prior to receiving, by the processing device of the first vehicle from the second vehicle over the network between the first vehicle and the second vehicle, the second application metadata associated with the second plurality of applications installed on the second vehicle, transmit, by the first vehicle to the second vehicle, first application metadata associated with a first plurality of applications installed on the first vehicle.

Example 71 is a method of managing applications of a first vehicle, the method comprising: establishing, by a processing device of the first vehicle, a first network with a second vehicle in proximity to the first vehicle; receiving, by the first vehicle, a second vehicle identifier (ID) from the second vehicle over the first network; transmitting the second vehicle ID and a first vehicle ID of the first vehicle to an administrative device over a second network; and determining an update compatibility between the first vehicle and the second vehicle based on compatibility information received from the administrative device in view of the second vehicle ID and the first vehicle ID.

Example 72 is the method of Example 71, further comprising: responsive to determining that the first vehicle has the update compatibility with the second vehicle, processing an application update received from the second vehicle.

Example 73 is the method of any of Examples 71-72, wherein processing the application update received from the second vehicle comprises: receiving, by the processing device of the first vehicle from the second vehicle over the first network, application metadata associated with a plurality of applications executing on the second vehicle; based on the application metadata, transmitting a list over the first network that identifies the application update associated with one or more applications of the plurality of applications to the second vehicle; and receiving the application update from the second vehicle over the first network.

Example 74 is the method of any of Examples 71-73, wherein the application metadata is second application metadata, and wherein the method further comprises: prior to receiving the second application metadata associated with the plurality of applications executing on the second vehicle, transmitting, by the first vehicle to the second vehicle over the first network, first application metadata associated with the plurality of applications executing on the first vehicle.

Example 75 is the method of any of Examples 71-74, further comprising: responsive to receiving the application update from the second vehicle over the first network, installing the application update on one or more electronic control units (ECUs) of the first vehicle.

Example 76 is the method of any of Examples 71-75, further comprising: responsive to receiving the application metadata associated with the plurality of applications executing on the second vehicle, processing the application metadata to generate the list that identifies the application update associated with the one or more applications of the plurality of applications executing on the second vehicle.

Example 77 is the method of any of Examples 71-76, further comprising: responsive to determining that the first vehicle does not have the update compatibility with the second vehicle, terminating the first network between the first vehicle and the second vehicle.

Example 78 is the method of any of Examples 71-77, wherein the first vehicle ID comprises a registration number that uniquely identifies the first vehicle.

Example 79 is the method of any of Examples 71-78, wherein the update compatibility indicates a compatibility between a first electronic control unit (ECU) of the first vehicle with a second ECU of the second vehicle.

Example 80 is the method of any of Examples 71-79, wherein the first network is a vehicle-to-vehicle (V2V) network.

Example 81 is a system of a first vehicle comprising: a memory; and a processing device, operatively coupled to the memory, to: establish, by the first vehicle, a first network with a second vehicle in proximity to the first vehicle; receive, by the first vehicle, a second vehicle identifier (ID) from the second vehicle over the first network; transmit the second vehicle ID and a first vehicle ID of the first vehicle to an administrative device over a second network; and determine an update compatibility between the first vehicle and the second vehicle based on compatibility information received from the administrative device in view of the second vehicle ID and the first vehicle ID.

Example 82 is the method of Example 81, wherein the processing device is further to: responsive to determining that the first vehicle has the update compatibility with the second vehicle, process an application update received from the second vehicle.

Example 83 is the method of any of Examples 81-82, wherein, to process the application update received from the second vehicle, the processing device is to: receive, by the first vehicle from the second vehicle over the first network, application metadata associated with a plurality of applications executing on the second vehicle; based on the application metadata, transmit a list over the first network that identifies the application update associated with one or more applications of the plurality of applications to the second vehicle; and receive the application update from the second vehicle over the first network.

Example 84 is the method of any of Examples 81-83, wherein the application metadata is second application metadata, and wherein the processing device is further to: prior to receiving the second application metadata associated with the plurality of applications executing on the second vehicle, transmit, by the first vehicle to the second vehicle over the first network, first application metadata associated with the plurality of applications executing on the first vehicle.

Example 85 is the method of any of Examples 81-84, wherein the processing device is further to: responsive to receiving the application update from the second vehicle over the first network, install the application update on one or more electronic control units (ECUs) of the first vehicle.

Example 86 is the method of any of Examples 81-85, wherein the processing device is further to: responsive to receiving the application metadata associated with the plurality of applications executing on the second vehicle, process the application metadata to generate the list that identifies the application update associated with the one or more applications of the plurality of applications executing on the second vehicle.

Example 87 is the method of any of Examples 81-86, wherein the processing device is further to: responsive to determining that the first vehicle does not have the update compatibility with the second vehicle, terminate the first network between the first vehicle and the second vehicle.

Example 88 is the method of any of Examples 81-87, wherein the first vehicle ID comprises a registration number that uniquely identifies the first vehicle.

Example 89 is the method of any of Examples 81-88, wherein the update compatibility indicates a compatibility between a first electronic control unit (ECU) of the first vehicle with a second ECU of the second vehicle.

Example 90 is the method of any of Examples 81-89, wherein the first network is a vehicle-to-vehicle (V2V) network.

Example 91 is a non-transitory computer-readable storage medium of a first vehicle comprising: a memory; and a processing device, operatively coupled to the memory, to: establish, by the processing device of the first vehicle, a first network with a second vehicle in proximity to the first vehicle; receive, by the first vehicle, a second vehicle identifier (ID) from the second vehicle over the first network; transmit the second vehicle ID and a first vehicle ID of the first vehicle to an administrative device over a second network; and determine an update compatibility between the first vehicle and the second vehicle based on compatibility information received from the administrative device in view of the second vehicle ID and the first vehicle ID.

Example 92 is the non-transitory computer-readable storage medium of Example 91, wherein the processing device is further to: responsive to determining that the first vehicle has the update compatibility with the second vehicle, process an application update received from the second vehicle.

Example 93 is the non-transitory computer-readable storage medium of any of Examples 91-92, wherein, to process the application update received from the second vehicle, the processing device is to: receive, by the first vehicle from the second vehicle over the first network, application metadata associated with a plurality of applications executing on the second vehicle; based on the application metadata, transmit a list over the first network that identifies the application update associated with one or more applications of the plurality of applications to the second vehicle; and receive the application update from the second vehicle over the first network.

Example 94 is the non-transitory computer-readable storage medium of any of Examples 91-93, wherein the application metadata is second application metadata, and wherein the processing device is further to: prior to receiving the second application metadata associated with the plurality of applications executing on the second vehicle, transmit, by the first vehicle to the second vehicle over the first network, first application metadata associated with the plurality of applications executing on the first vehicle.

Example 95 is the non-transitory computer-readable storage medium of any of Examples 91-94, wherein the processing device is further to: responsive to receiving the application update from the second vehicle over the first network, install the application update on one or more electronic control units (ECUs) of the first vehicle.

Example 96 is the non-transitory computer-readable storage medium of any of Examples 91-95, wherein the processing device is further to: responsive to receiving the application metadata associated with the plurality of applications executing on the second vehicle, process the application metadata to generate the list that identifies the application update associated with the one or more applications of the plurality of applications executing on the second vehicle.

Example 97 is the non-transitory computer-readable storage medium of any of Examples 91-96, wherein the processing device is further to: responsive to determining that the first vehicle does not have the update compatibility with the second vehicle, terminate the first network between the first vehicle and the second vehicle.

Example 98 is the non-transitory computer-readable storage medium of any of Examples 91-97, wherein the first vehicle ID comprises a registration number that uniquely identifies the first vehicle.

Example 99 is the non-transitory computer-readable storage medium of any of Examples 91-98, wherein the update compatibility indicates a compatibility between a first electronic control unit (ECU) of the first vehicle with a second ECU of the second vehicle.

Example 100 is the non-transitory computer-readable storage medium of any of Examples 91-99, wherein the first network is a vehicle-to-vehicle (V2V) network.

Unless specifically stated otherwise, terms such as "establishing," "receiving," "transmitting," "installing," "requesting," "processing," "comparing," "detecting," "altering," "determining," "terminating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the term "engine" is not intended to be limiting of any particular implementation for accomplishing and/or performing the actions, operations, processes, etc., attributable to and/or performed by the engine. An engine may be, but is not limited to, software, hardware and/or firmware or any combination thereof that performs the specified functions including, but not limited to, any use of a general and/or specialized processing device in combination with appropriate software loaded or stored in a machine readable memory and executed by the processing device. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of managing applications of a first vehicle, the method comprising:
    establishing, by the first vehicle, a network with a second vehicle in proximity to the first vehicle;
    receiving, by a processing device of the first vehicle from the second vehicle over the network, second application metadata associated with a second plurality of applications executing on the second vehicle;
    determining, based on the second application metadata and an install threshold, one or more application updates associated with the second plurality of applications, wherein the install threshold indicates a minimum duration for the second plurality of applications to execute on the second vehicle;

transmitting a list to the second vehicle over the network, wherein the list identifies the one or more application updates associated with the second plurality of applications;

receiving the one or more application updates from the second vehicle over the network, wherein the one or more application updates correspond to one or more of a first plurality of applications executing on computing devices of the first vehicle, and wherein the method further comprises: prior to receiving the second application metadata associated with the second plurality of applications executing on the second vehicle, transmitting, by the first vehicle to the second vehicle, first application metadata associated with the first plurality of applications executing on the computing devices of the first vehicle; and responsive to receiving the one or more application updates from the second vehicle over the network, installing the one or more application updates on one or more electronic control units (ECUs) of the first vehicle.

2. The method of claim 1, wherein the installing of the one or more application updates on the one or more ECUs of the first vehicle is delayed until the first vehicle is stationary.

3. The method of claim 1, further comprising:
prior to receiving, by the first vehicle from the second vehicle over the network, the second application metadata associated with the second plurality of applications executing on the second vehicle, requesting, by the first vehicle, the second application metadata from the second vehicle.

4. The method of claim 1, further comprising:
responsive to receiving the second application metadata associated with the second plurality of applications executing on the second vehicle, processing the second application metadata to generate the list of the one or more application updates associated with the second plurality of applications executing on the second vehicle.

5. The method of claim 4, wherein processing the second application metadata to generate the list of the one or more application updates associated with the second plurality of applications executing on the second vehicle comprises comparing a version identifier (ID) included in the second application metadata with a version ID of respective ones of the first plurality of applications executing on the first vehicle.

6. The method of claim 4, wherein processing the second application metadata to generate the list of the one or more application updates associated with the second plurality of applications executing on the second vehicle comprises detecting a compatibility of computing devices of the first vehicle with computing devices of the second vehicle.

7. The method of claim 6, wherein detecting the compatibility of the computing devices of the first vehicle with the computing devices of the second vehicle comprises comparing a device identifier (ID) included in the second application metadata with a device ID of respective ones of the computing devices of the first vehicle.

8. A system of a first vehicle comprising:
a memory; and
a processing device, operatively coupled to the memory, to:
establish, by the first vehicle, a network with a second vehicle in proximity to the first vehicle;

receive, by the first vehicle from the second vehicle over the network, second application metadata associated with a second plurality of applications executing on the second vehicle;

determine, based on the second application metadata and an install threshold, one or more application updates associated with the second plurality of applications, wherein the install threshold indicates a minimum duration for the second plurality of applications to execute on the second vehicle;

transmit a list to the second vehicle over the network, wherein the list identifies the one or more application updates associated with the second plurality of applications;

receive the one or more application updates from the second vehicle over the network, wherein the one or more application updates correspond to one or more of a first plurality of applications executing on computing devices of the first vehicle, and wherein the processing device is further to: prior to receiving the second application metadata associated with the second plurality of applications executing on the second vehicle, transmit, by the first vehicle to the second vehicle, first application metadata associated with the first plurality of applications executing on the computing devices of the first vehicle; and responsive to receiving the one or more application updates from the second vehicle over the network, install the one or more application updates on one or more electronic control units (ECUs) of the first vehicle.

9. The system of claim 8, wherein the processing device is further to: prior to receiving, by the first vehicle from the second vehicle over the network, the second application metadata associated with the second plurality of applications executing on the second vehicle, request, by the first vehicle, the second application metadata from the second vehicle.

10. The system of claim 8, wherein the processing device is further to: responsive to receiving the second application metadata associated with the second plurality of applications executing on the second vehicle, process the second application metadata to generate the list of the one or more application updates associated with the second plurality of applications executing on the second vehicle.

11. The system of claim 10, wherein, to process the second application metadata to generate the list of the one or more application updates associated with the second plurality of applications executing on the second vehicle, the processing device is to compare a version identifier (ID) included in the second application metadata with a version ID of respective ones of the first plurality of applications executing on the first vehicle.

12. The system of claim 10, wherein, to process the second application metadata to generate the list of the one or more application updates associated with the second plurality of applications executing on the second vehicle, the processing device is to detect a compatibility of computing devices of the first vehicle with computing devices of the second vehicle.

13. The system of claim 12, wherein, to detect the compatibility of the computing devices of the first vehicle with the computing devices of the second vehicle, the processing device is to compare a device identifier (ID) included in the second application metadata with a device ID of respective ones of the computing devices of the first vehicle.

14. A non-transitory computer-readable storage medium including instructions that, when executed by a processing device of a first vehicle, cause the processing device to:
- establish, by the first vehicle, a network with a second vehicle in proximity to the first vehicle;
- receive, by the processing device of the first vehicle from the second vehicle over the network, second application metadata associated with a second plurality of applications executing on the second vehicle;
- determine, based on the second application metadata and an install threshold, one or more application updates associated with the second plurality of applications, wherein the install threshold indicates a minimum duration for the second plurality of applications to execute on the second vehicle;
- transmit a list to the second vehicle over the network, wherein the list identifies the one or more application updates associated with the second plurality of applications;
- receive the one or more application updates from the second vehicle over the network, wherein the one or more application updates correspond to one or more of a first plurality of applications executing on computing devices of the first vehicle, and
- wherein the instructions further cause the processing device to: prior to receiving the second application metadata associated with the second plurality of applications executing on the second vehicle, transmit, by the first vehicle to the second vehicle, first application metadata associated with the first plurality of applications executing on the computing devices of the first vehicle; and
- responsive to receiving the one or more application updates from the second vehicle over the network, install the one or more application updates on one or more electronic control units (ECUs) of the first vehicle.

* * * * *